United States Patent
Nakao et al.

(10) Patent No.: US 7,632,190 B2
(45) Date of Patent: Dec. 15, 2009

(54) CONSTANT VELOCITY JOINT

(75) Inventors: Shouichi Nakao, Utsunomiya (JP); Kazuki Ido, Utsunomiya (JP); Akira Yokoyama, Kanuma (JP)

(73) Assignee: Honda Motor Co., Ltd., Minato-Ku, Tokyo (JP)

( * ) Notice: Subject to any disclaimer, the term of this patent is extended or adjusted under 35 U.S.C. 154(b) by 343 days.

(21) Appl. No.: 10/586,185

(22) PCT Filed: Jan. 13, 2005

(86) PCT No.: PCT/JP2005/000317

§ 371 (c)(1),
(2), (4) Date: Jul. 14, 2006

(87) PCT Pub. No.: WO2005/068863

PCT Pub. Date: Jul. 28, 2005

(65) Prior Publication Data
US 2007/0161428 A1 Jul. 12, 2007

(30) Foreign Application Priority Data

| Jan. 15, 2004 | (JP) | ............... 2004-008524 |
| Jun. 30, 2004 | (JP) | ............... 2004-192637 |
| Jun. 30, 2004 | (JP) | ............... 2004-194230 |
| Jun. 30, 2004 | (JP) | ............... 2004-194274 |
| Dec. 10, 2004 | (JP) | ............... 2004-358176 |
| Jan. 11, 2005 | (JP) | ............... 2005-003787 |

(51) Int. Cl.
*F16D 3/224* (2006.01)
(52) U.S. Cl. .................. 464/145; 464/906
(58) Field of Classification Search ......... 464/140–146, 464/906
See application file for complete search history.

(56) References Cited

U.S. PATENT DOCUMENTS

| 3,076,323 | A | * | 2/1963 | Ancktor ............... 464/145 |
| 6,267,682 | B1 | | 7/2001 | Sone et al. |
| 6,368,223 | B1 | | 4/2002 | Ouchi et al. |
| 6,705,947 | B1 | | 3/2004 | Hildebrandt et al. |
| 2002/0022528 | A1 | | 2/2002 | Nakagawa et al. |

(Continued)

FOREIGN PATENT DOCUMENTS

DE 19808029 C1 12/1999

(Continued)

OTHER PUBLICATIONS

F.F. Miller, et al., "Rzeppa Universal Joint", 2nd edition, The Society of Automotive Engineers, Inc., 1991, pp. 145-149.

*Primary Examiner*—Greg Binda
(74) *Attorney, Agent, or Firm*—Squire, Sanders & Dempsey, L.L.P.

(57) ABSTRACT

Lateral cross-sections of first guiding grooves provided in the inner wall surface of an outer cup are formed in a circular arc shape for one point contact with balls, and lateral cross-sections of second guiding grooves provided in the outer wall surface of an inner ring are formed in an elliptic arc shape for two-point contact with the balls. The diameter of a ball and an offset amount between a first and a second groove is set to satisfy the expression of $0.12 \leq V \leq 0.14$ with V being the ratio of the two values.

42 Claims, 22 Drawing Sheets

U.S. PATENT DOCUMENTS

| | | |
|---|---|---|
| 2002/0032064 A1 | 3/2002 | Sone et al. |
| 2002/0187841 A1 | 12/2002 | Iihara et al. |
| 2002/0193195 A1 | 12/2002 | Ishiguro et al. |
| 2003/0017877 A1 | 1/2003 | Kobayashi et al. |
| 2003/0050125 A1 | 3/2003 | Kadota et al. |
| 2003/0054893 A1* | 3/2003 | Thomas ................ 464/145 |
| 2005/0261067 A1 | 11/2005 | Kobayashi et al. |

FOREIGN PATENT DOCUMENTS

| | | |
|---|---|---|
| GB | 2331570 A | 5/1999 |
| JP | 06-109028 | 4/1994 |
| JP | 9-317783 | 12/1997 |
| JP | 9-317784 | 12/1997 |
| JP | 11-218147 | 8/1999 |
| JP | 2000-18267 | 1/2000 |
| JP | 2000-055069 | 2/2000 |
| JP | 2000-145805 | 5/2000 |
| JP | 2000-266071 | 9/2000 |
| JP | 2001-330051 | 11/2001 |
| JP | 2001-347845 | 12/2001 |
| JP | 2001-349332 | 12/2001 |
| JP | 2002-13544 | 1/2002 |
| JP | P2002-323061 | 11/2002 |
| JP | 2002-372067 | 12/2002 |
| JP | 2003-42146 | 2/2003 |
| JP | 2003-097590 | 3/2003 |
| JP | 2003-508697 | 3/2003 |
| JP | 2003-4062 | 8/2003 |
| JP | 2003-307235 | 10/2003 |

* cited by examiner

FIG. 5 (PRESENT EMBODIMENT)

FIG. 6 (COMPARATIVE EXAMPLE)

CONSTANT VELOCITY JOINT

TECHNICAL FIELD

The present invention relates to a constant-velocity joint for connecting a transmission shaft to another transmission shaft in an automotive driveline, for example.

BACKGROUND ART

Heretofore, automotive drivelines employ a constant-velocity joint for connecting a transmission shaft to another transmission shaft and transmitting rotational power to the axles. In recent years, there has been a growing need for lighter constant-velocity joints and hence smaller constant-velocity joints. The mechanical strength, durability, load capacity, etc. of constant-velocity joints are determined by the basic dimensions of various components of the constant-velocity joints. It is necessary to determine those basic dimensions for smaller constant-velocity joints while maintaining the mechanical strength, durability, load capacity, etc. at desired levels.

Japanese Laid-Open Patent Publication No. 2001-330051 discloses a fixed constant-velocity universal joint having an outer joint member, an inner joint member, eight torque transmission balls, and a retainer. According to a disclosed technical concept for establishing basic settings of the universal joint, the ratio Rw (=W/PCR) of the axial width (W) of the inner joint member to the length (PCR) of a line segment interconnecting the center of a guide groove defined in the inner joint member and the centers of the torque transmission ball is selected to be in the range of $0.69 \leq Rw \leq 0.84$.

Japanese Laid-Open Patent Publication No. 2003-97590 reveals a fixed constant-velocity universal joint having an outer race, an inner race, six torque transmission balls, and a cage. It is also disclosed that, if it is assumed that a drive shaft has a diameter d, and the torque transmission balls have a diameter $D_B$ and a pitch circle diameter $D_P$, then the ratio $D_B/d$ of the diameter $D_B$ to the diameter d is set to a value in the range from 0.65 to 0.72, and the ratio $D_P/D_B$ of the pitch circle diameter $D_P$ to the diameter $D_B$ is set to a value in the range from 3.4 to 3.8.

The publication, "Universal Joint and Driveshaft Design Manual, Advances in Engineering Series No. 7" (United States), edited by Charles E. Cooney, Jr., 2nd edition, The Society of Automotive Engineers, Inc., 1991, pp. 145-149, (hereinafter referred to as "general document") discloses a Rzeppa constant-velocity joint. The disclosed Rzeppa constant-velocity joint has an outer race and an inner race, both having ball grooves therein. The ball grooves in the outer race and the ball grooves in the inner race have respective centers located on joint shafts (a drive shaft and a driven shaft) at respective positions that are offset equal distances from the center of the joint.

When the Rzeppa constant-velocity joint is in operation, the ball grooves in the outer race and the ball grooves in the inner race move relative to each other to position the six balls retained by the cage on a constant-velocity plane or a bisecting angle plane at one-half of the joint angle formed between the joint shafts, keeping drive contact points on the constant-velocity plane at all times to provide constant-velocity transmission.

The general document describes that the ball groove funnel angle, which is an angle formed between a common normal to load-side contact points between the outer race ball grooves (guide grooves) and the balls, and a common normal to load-side contact points between the inner race ball grooves (guide grooves) and the balls, is approximately in the range from 15 degrees to 17 degrees. This angular range allows the Rzeppa constant-velocity joint to make smooth angulation without encountering friction locking when passing through the 0-degree joint angle.

The general document also discloses that the ball grooves, in general, have a cross-sectional shape (perpendicular to the joint shafts) as a circular arc or an elliptical arc, and the contact angle between the ball grooves having an elliptical arc cross section and the balls is in the range from 30 degrees to 45 degrees, with 45 degrees being commonly used.

Japanese Laid-Open Patent Publication No. 2003-4062 and Japanese Laid-Open Patent Publication No. 9-317784 show fixed constant-velocity universal joints each having an outer race, an inner race, eight balls, and a cage. The outer race has guide grooves (track grooves) having respective groove bottoms which include a curved region whose center is offset a distance (F) in one direction from the center of an inside-diameter surface of the outer race, and the inner race has guide grooves (track grooves) having respective groove bottoms which include a curved region whose center is also offset the distance (F) in the opposite direction from the center of an outside-diameter surface of the inner race.

It is revealed in Japanese Laid-Open Patent Publication No. 2003-4062 that the ratio R1 (=F/PCR) of the offset distance (F) to the length (PCR) of a line segment interconnecting the center of the guide grooves in the outer race or the center of the guide grooves in the inner race to the centers of the balls is selected to be in the range of $0.069 \leq R1 \leq 0.121$.

Japanese Laid-Open Patent Publication No. 9-317784 discloses that the ratio R1 (=F/PCR) of the offset distance (F) to the length (PCR) of a line segment interconnecting the center of the guide grooves in the outer race or the center of the guide grooves in the inner race to the centers of the balls is selected to be in the range of $0.069 \leq R1 \leq 0.121$, and the contact angle between the guide grooves and the balls is set to a value equal to or smaller than 37 degrees.

Japanese Laid-Open Patent Publication No. 2002-323061 discloses a fixed constant-velocity universal joint having an outer joint member, an inner joint member, eight torque transmission balls, and a retainer. The ball grooves (track grooves) in the outer joint member and the ball grooves (track grooves) in the inner joint member have respective centers located at respective positions that are offset equal distances axially in opposite directions. The PCD gap (the difference between the pitch circle diameter of the ball grooves in the outer joint member and the pitch circle diameter of the ball grooves in the inner joint member) in the ball tracks is in the range from 5 to 50 µm.

According to Japanese Laid-Open Patent Publication No. 2002-323061, the PCD gap selected in the range from 5 to 50 µm is effective to increase the durability of the fixed constant-velocity universal joint and stabilize variations in the service life thereof under high loads.

It is also disclosed in Japanese Laid-Open Patent Publication No. 2002-323061 that the radial gap between the outer joint member and the inner joint member is in the range from 20 to 100 µm, and the radial gap between the retainer and the inner joint member is also in the range from 20 to 100 µm.

As shown in FIG. 24 of the accompanying drawings, one conventional constant-velocity joint of the above type has an outer member (outer race) 1 having a plurality of curved guide grooves 1b axially defined in a spherical inside-diameter surface 1a, and an inner member (inner race) 2 having a plurality of curved guide grooves 2b axially defined in a spherical outside-diameter surface 2a and splines 2c on an inside-diameter surface thereof. The guide grooves 1b in the outer member 1 and the guide grooves 2b in the inner member 2 make up ball rolling grooves with torque transmission balls 3 disposed therein. The torque transmission balls 3 are retained in respective retaining windows 4a defined in a substantially ring-shaped retainer 4.

The mechanical strength of the joint at the time the outer member 1 and the inner member 2 are at an angle to each other is determined by the mechanical strength of the retainer 4. Therefore, in order to increase the mechanical strength of the joint at the time the outer member 1 and the inner member 2 are at an angle to each other, the mechanical strength of the retainer 4 needs to be increased.

The mechanical strength of the retainer 4 is increased when the cross-sectional area of the retainer 4 is increased. The cross-sectional area of the retainer 4 may be increased by a method (hereinafter referred to as "first method") wherein the inner spherical diametrical dimension of the retainer 4 is reduced and the outer spherical diametrical dimension of the retainer 4 is increased to increase the wall thickness of the retainer 4, a method (hereinafter referred to as "second method") wherein the cross-sectional area of a region of the retainer 4 which undergoes forces tending to push out the balls 3 when the joint is angulated, or a method (hereinafter referred to as "third method") wherein the cross-sectional area of columns 4b positioned between the windows 4a of the retainer 4 is increased.

According to the first and second methods, however, the retainer 4 becomes heavy and has a greater width, and the balls 3 tend to bite into the guide grooves 1b, reducing the durability of the outer member 1. It is possible, therefore, that the wider retainer 4 may not be assembled properly into the outer member 1.

According to the third method, if the columns 4b are elongated to reduce the opening areas of the retaining windows 4a, the balls 3 are apt to contact the columns 4b and cannot be neatly assembled in the retainer 4. If the retaining windows 4a are too small, then the inner member 2 cannot easily be assembled into the retainer 4.

Japanese Laid-Open Patent Publication No. 2002-13544 discloses a constant-velocity universal joint having a retainer with round corners 4c in retaining windows or pockets 4a, wherein the ratio R/D of the radius R of curvature of the round corners 4c to the diameter D of the balls 3 is set in the range of $0.22 \leqq R/D$.

However, the fixed constant-velocity universal joint disclosed in Japanese Laid-Open Patent Publication No. 2001-330051 is made of up a large number of parts, is highly costly to manufacture, and is difficult to produce in practice.

The dimensional settings of the fixed constant-velocity universal joint disclosed in Japanese Laid-Open Patent Publication No. 2003-97590 serve to increase the mechanical strength of the cage (retainer) which retains the torque transmission balls, and do not contribute to a reduction in the size of the fixed constant-velocity universal joint.

Ball tracks which are defined by the ball grooves in the outer race and the ball grooves in the inner race are funnel-shaped, progressively spreading in the axial direction from the inner end toward an outer opening of the outer race. As the ball grooves in the outer race and the ball grooves in the inner race are offset equal distances from the joint center, the depths of the ball grooves in the outer and inner races are not uniform in the axial direction.

With the structure disclosed in the general document, since the depths of the ball grooves in the outer race and the ball grooves in the inner race are small, when the constant-velocity joint operates at large joint angles or under high loads, the contact ellipse of the balls protrudes from the ball grooves, tending to bring the balls onto shoulders (edges) of the ball grooves, causing the balls to crack or to wear down the shoulders (edges) of the ball grooves, resulting in a reduction in the durability of the constant-velocity joint. Furthermore, when the constant-velocity joint is placed under a high load, the positions where the ball grooves and the balls contact each other are brought closely to the end of the inner race, and the contact ellipse of the balls protrudes from the ball grooves, thus increasing the contact pressure imposed on the balls grooves by the balls.

According to Japanese Laid-Open Patent Publication No. 2003-4062 and Japanese Laid-Open Patent Publication No. 9-317784, it is disclosed that the ratio R1 (=F/PCR) of the offset distance (F) to the length (PCR) of a line segment interconnecting the center of the guide grooves in the outer race or the center of the guide grooves in the inner race to the centers of the balls is set to a certain value. If the diameter of the balls is reduced or the size of the constant-velocity joint itself is reduced, and the wall thickness of the retainer, which is the mechanically weakest component, is to be maintained, then the guide grooves in the outer race and the inner race are necessarily of an insufficient depth, and the shoulders of the guide grooves tend to be cracked or worn as described above.

Japanese Laid-Open Patent Publication No. 2002-323061 describes that a fixed constant-velocity universal joint having eight torque transmission balls and a fixed constant-velocity universal joint having six torque transmission balls have different basic structures, and the PCD gaps thereof are set to inherent values adequate for their respective structures. Nothing is disclosed or suggested in this publication with respect to settings, such as the PCD gap, etc., for a fixed constant-velocity universal joint having six torque transmission balls.

It is important, in the design of fixed constant-velocity universal joints of the above type, how to establish the PCD (pitch circle diameter) gap with respect to ball tracks that are defined by the confronting ball grooves defined in the outer and inner joint members. If the PCD gap is too small, then it will be difficult to assemble the balls into the ball tracks, and restraint forces applied to the balls will be too large to allow the balls to make smooth rolling movement. If the PCD gap is too large, then striking noise will be generated between the balls and the windows of the retainer and the vibration of the joint itself will increase.

According to Japanese Laid-Open Patent Publication No. 2002-13544, the ratio R/D of the radium R of curvature of the round corners in the pockets of the retainer (retainer windows) to the diameter D of the balls is set for the purpose of increasing the durability and the mechanical strength of the retainer. However, the above ratio setting is not effective enough to increase the mechanical strength of the retainer.

A major object of the present invention is to provide a constant-velocity joint wherein the surface pressure acting on guide grooves due to contact with balls is reduced for increased durability.

Another object of the present invention is to provide a constant-velocity joint wherein the shoulders of guide grooves are prevented from being cracked or worn for increased durability.

Still another object of the present invention is to provide a constant-velocity joint having six balls wherein various clearances and an offset distance of the retaining windows of a retainer are set to optimum values to reduce the surface pressures, which are directly related to the service life of the constant-velocity joint, acting between outer race guide grooves and the balls and between inner race guide grooves and the balls, for increased durability.

A further object of the present invention to provide a constant-velocity joint which is capable of being designed for various dimensional settings suitable for a small joint size while maintaining various characteristics, i.e., mechanical strength, durability, load capacity, etc., at desired levels.

Yet another object of the present invention is to provide a constant-velocity joint, which includes a retainer having desired mechanical strength, and which is capable of being assembled with increased efficiency.

DISCLOSURE OF THE INVENTION

Problems to be Solved by the Invention

According to the constant-velocity joint of the present invention, each of first guide grooves held in contact with a corresponding one of balls at a single point has a transverse cross section extending perpendicularly to the axial direction and having a single arc shape, and each of second guide grooves held in contact with a corresponding one of the balls at two points has a transverse cross section extending perpendicularly to the axial direction and having an elliptically arc shape, whereby surface pressure acting on the guide grooves due to contact with the balls is reduced for increased durability compared with the conventional constant-velocity joints.

In this case, for higher durability with reduced surface pressure, ratios of a radius (M) of each of the first guide grooves in a transverse cross section thereof and radiuses (P, Q) of each of the second guide grooves in a transverse cross section thereof to a diameter (N) of the balls may be set in a range from 0.51 to 0.55, a contact angle of each of the balls with respect to one of the first guide grooves may be set to zero on a vertical line (L), and a contact angle ($\alpha$) of each of the balls with respect to one of the second guide grooves may be set in a range from 13 degrees to 22 degrees from the vertical line (L).

Preferably, the contact angle ($\alpha$) of each of the balls with respect to one of the second guide grooves is set in a range from 15 degrees to 20 degrees from the vertical line (L).

Further, in the present invention, a PCD clearance is set in a range from 0 to 100 µm, because if the PCD clearance is smaller than 0 µm, then the balls cannot be assembled in place efficiently and cannot roll smoothly, resulting in poor durability, and if the PCD clearance is in excess of 100 µm, then the contact ellipse of the balls held in contact with the first and second guide grooves protrudes from the shoulders at the groove edges at high load, increasing the surface pressure and cracking the shoulders, with the result that durability is lowered.

In this case, a spherical clearance defined as {(outer member inner-spherical-surface diameter)−(retainer outer-spherical-surface diameter)}+{(retainer inner-spherical-surface diameter)−(inner ring outer-spherical-surface diameter)} is preferably set to a value in the range from 50 to 200 µm.

If the spherical clearance is less than 50 µm, then seizure will be caused due to a lubrication failure between the inner surface of the outer member and the outer surface of the retainer, and also between the outer surface of the inner ring and the inner surface of the retainer, adversely affecting the mechanism of the constant-velocity joint. If the spherical clearance is greater than 200 µm, then striking noise will be generated between the outer member and the inner ring, and the retainer, adversely affecting the commercial value of the constant-velocity joint.

Each of retaining windows of the retainer preferably has a transverse center which is offset from a center of spherical outer and inner surfaces of the retainer in an axial direction of the retainer by a distance ranging from 20 to 100 µm.

If the distance offset from the center of the spherical outer and inner surfaces is smaller than 20 µm, then restraint forces applied to the balls will be not large enough to maintain a constant-velocity transmission capability. If the distance offset is greater than 100 µm, then restraint forces applied to the balls will be too large for the balls to roll smoothly, resulting in poor durability.

According to the present invention, the ratio V (=T/N) of the diameter N of the balls to the distance T by which the centers (the points H, R) of curvature of the first guide grooves and the second guide grooves is set to satisfy the expression $0.12 \leq V \leq 0.14$, whereby the balls are effectively prevented from moving onto or cracking and wearing the shoulders at the edges of the first guide grooves and the second guide grooves to make the constant-velocity joint more durable.

If the ratio V(T/N) of the diameter N to the offset distance T is less than 0.12, then the funnel angle formed between the first guide grooves and the second guide grooves is minimized, allowing the balls to be easily locked when the constant-velocity joint is not in rotation, and also resulting in a reduction in the efficiency with which the constant-velocity joint is assembled. On the other hand, if the ratio V(T/N) of the diameter N to the offset distance T is in excess of 0.14, then since the first guide grooves and the second guide grooves are made shallow, the balls are easily liable to move onto or crack and wear the shoulders at the edges of the first guide grooves and the second guide grooves.

Further, according to the present invention, a ratio (Dp/D) of a dimension (Dp) of an outer/inner PCD, which represents the outer PCD and the inner PCD that are equal to each other, to a diameter (D) of an inner-ring serrated-region inside-diameter surface on an inner wall of the inner ring is preferably set in a range of $1.9 \leq (Dp/D) \leq 2.2$. If the dimensional ratio (Dp/D) of the dimension (Dp) of the outer/inner PCD to the diameter (D) of the inner-ring serrated-region inside-diameter surface on an inner wall of the inner ring is less than 1.9, then the wall thickness of the inner ring is too small, resulting in a reduction in the mechanical strength thereof. If the dimensional ratio (Dp/D) is in excess of 2.2, then the size of the constant-velocity joint cannot be reduced.

Also, a ratio (N/Dp) of a diameter (N) of the balls to a dimension (Dp) of an outer/inner PCD, which represents the outer PCD and the inner PCD that are equal to each other, is preferably set in a range of $0.2 \leq (N/Dp) \leq 0.5$. If the dimensional ratio (N/Dp) is less than 0.2, then the diameter of the balls is too small, resulting in a reduction in the mechanical strength thereof. If the dimensional ratio (N/Dp) is in excess of 0.5, then the balls are so large that the wall thickness of the outer member is relatively small, resulting in a reduction in the mechanical strength thereof.

Further, a ratio (Do/Dp) of an outside diameter (Do) of the outer member to a dimension (Dp) of an outer/inner PCD, which represents the outer PCD and the inner PCD that are equal to each other, is set in a range of $1.4 \leq (Do/Dp) \leq 1.8$. If the dimensional ratio (Do/Dp) is less than 1.4, then the wall thickness of the outer member is too small, resulting in a reduction in the mechanical strength thereof. If the dimensional ratio (Do/Dp) is in excess of 1.8, then the outside diameter of the outer member is increased, making it impossible to reduce the size of the constant-velocity joint.

The ratio (Dp/D) of the dimension (Dp) of the outer/inner PCD, which represents the outer PCD and the inner PCD that are equal to each other, to the diameter (D) of the inner-ring serrated-region inside-diameter surface on the inner wall of the inner ring is preferably set in a range of $1.9 \leq (Dp/D) \leq 2.2$, the ratio (N/Dp) of the diameter (N) of the balls to the dimension (Dp) of the outer/inner PCD, which represents the outer PCD and the inner PCD that are equal to each other, is preferably set in a range of $0.2 \leq (N/Dp) \leq 0.5$, and the ratio (Do/Dp) of the outside diameter (Do) of the outer member to the dimension (Dp) of the outer/inner PCD, which represents the outer PCD and the inner PCD that are equal to each other, is preferably set in a range of $1.4 \leq (Do/Dp) \leq 1.8$.

Further, according to the present invention, each of the retaining windows has an opening length (WL) extending in a circumferential direction of the retainer, and a ratio (WL/N) of the opening length (WL) to a diameter (N) of the balls is preferably set in a range of $1.30 \leq (WL/N) \leq 1.42$. Each of the retaining windows has corners each having a radius (R) of curvature, and a ratio (R/N) of the radius (R) of curvature to the diameter (N) of the balls is preferably set in a range of $0.23 \leq (R/N) \leq 0.45$.

With this ratio (R/N) of 0.23 or more, a maximum major stress load on the columns between the retaining windows is reduced for increasing the mechanical strength of the retainer. On the other hand, with the ratio (R/N) of 0.45 or less, it is possible to effectively prevent the balls and the inner ring from failing to be assembled due to an excessively large radius of curvature of the corners of the retaining windows.

Each of the first guide grooves and the second guide grooves may have a curved region and a straight region (S1, S2) extending in a longitudinal direction thereof. Further, each of the first guide grooves and the second guide grooves preferably has only a curved region extending in a longitudinal direction thereof.

BEST MODE FOR CARRYING OUT THE INVENTION

Figure 1:
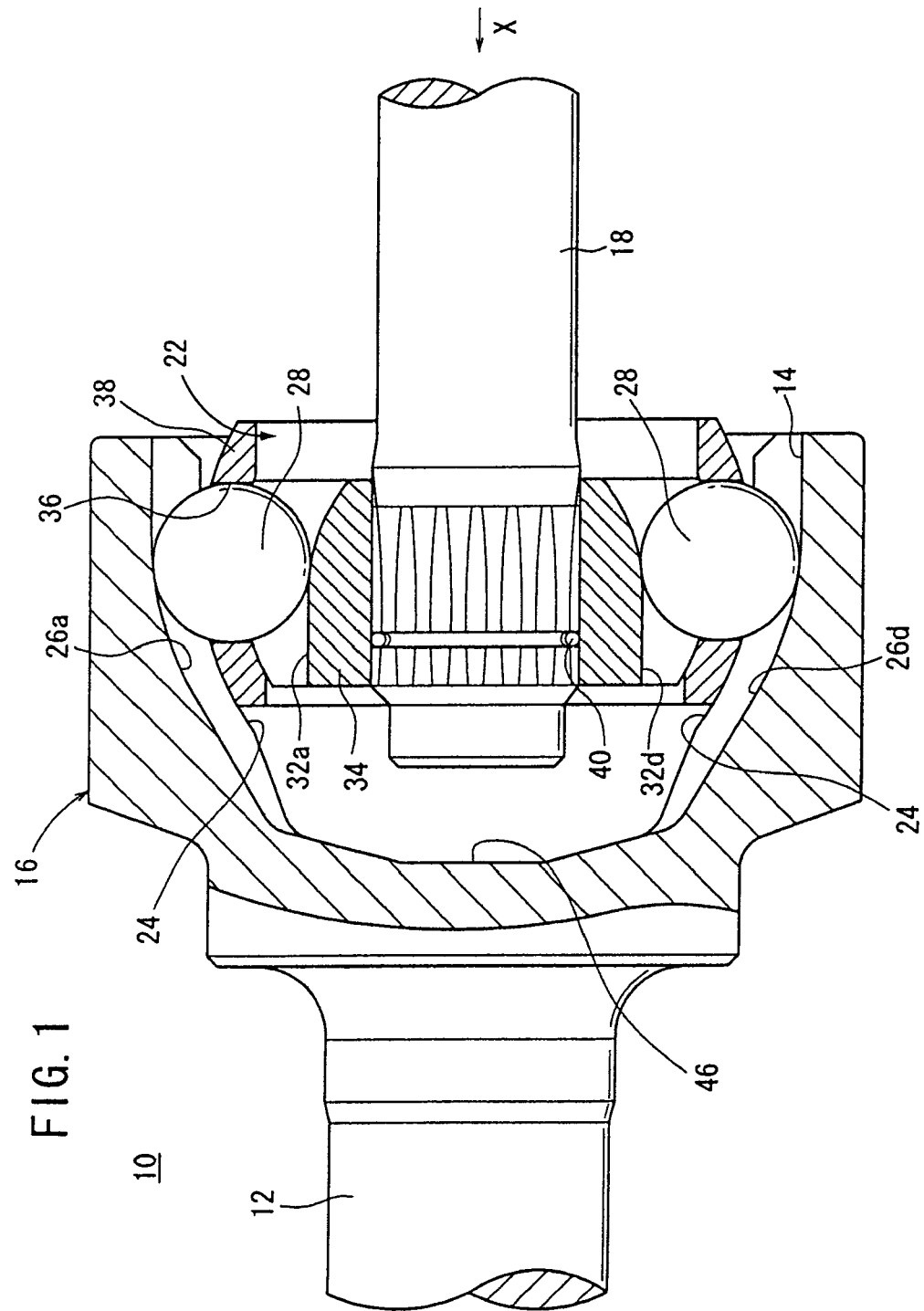
FIG. 1 is a longitudinal cross-sectional view, taken along an axial direction, of a constant-velocity joint according to an embodiment of the present invention.

FIG. 1 shows a constant-velocity joint 10 according to an embodiment of the present invention. In the description which follows, a longitudinal cross section refers to a cross section along the axial direction of a first shaft 12 and a second shaft 18, and a transverse cross section to a cross section perpendicular to the axial direction.

The constant-velocity joint 10 is basically constructed of a bottomed cylindrical outer cup (outer member) 16 integrally joined to an end of a first shaft 12 and having an opening 14 that opens away from the first shaft 12, and an inner member 22 fixed to an end of a second shaft 18 and housed in the outer cup 16.

Figure 3:
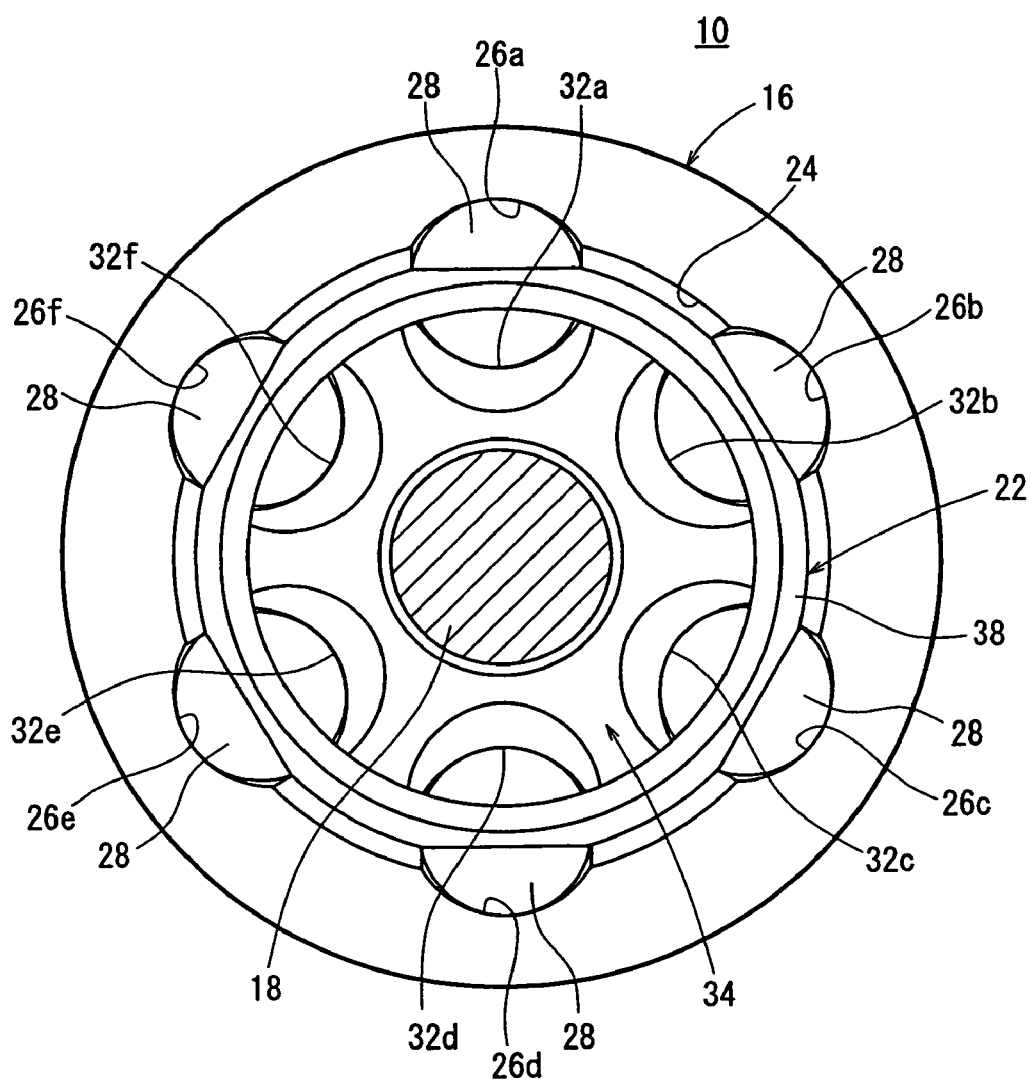
FIG. 3 is a side elevational view, partly in cross section, as seen in the axial direction indicated by the arrow X in FIG. 1, of the constant-velocity joint shown in FIG. 1.

As shown in FIGS. 1 and 3, the outer cup 16 has a spherical inside-diameter surface 24 on its inner wall. The inside-diameter surface 24 has six first guide grooves 26a through 26f extending in the axial direction and angularly spaced at 60-degree intervals around the axis thereof.

Figure 2:
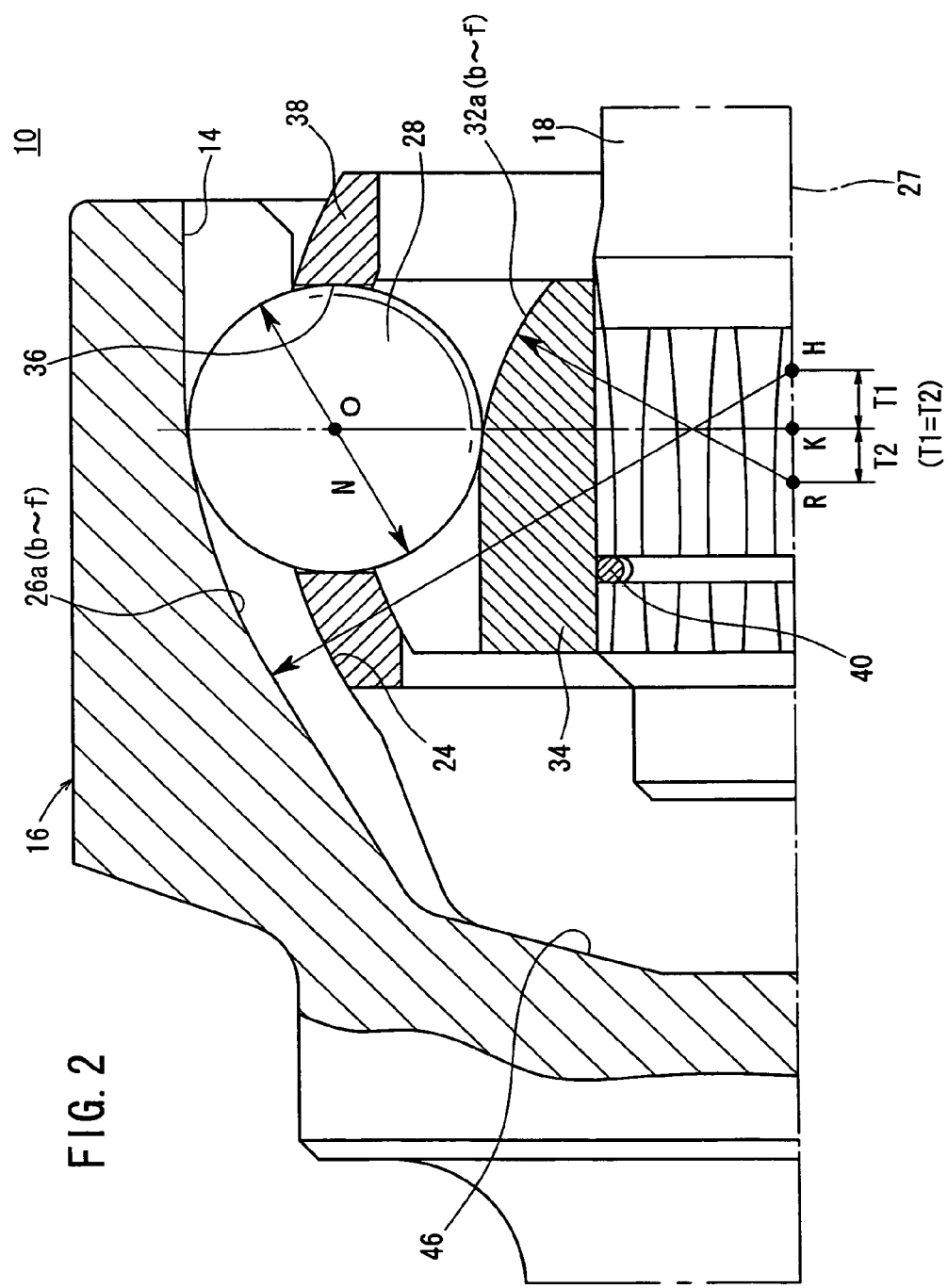
FIG. 2 is an enlarged fragmentary longitudinal cross-sectional view of the constant-velocity joint shown in FIG. 1.

As shown in FIG. 2, the first guide grooves 26a (26b through 26f), each having a curved axial longitudinal cross section, have a common center of curvature at a point H. The point H is in a position that is offset a distance T1 from the center K of the spherical inside-diameter surface 24 (where a hypothetical plane interconnecting the centers O of balls 28 [ball center plane] and a joint axis 27 intersect) in the axial direction toward the opening 14 of the outer cup 16.

Figure 4:
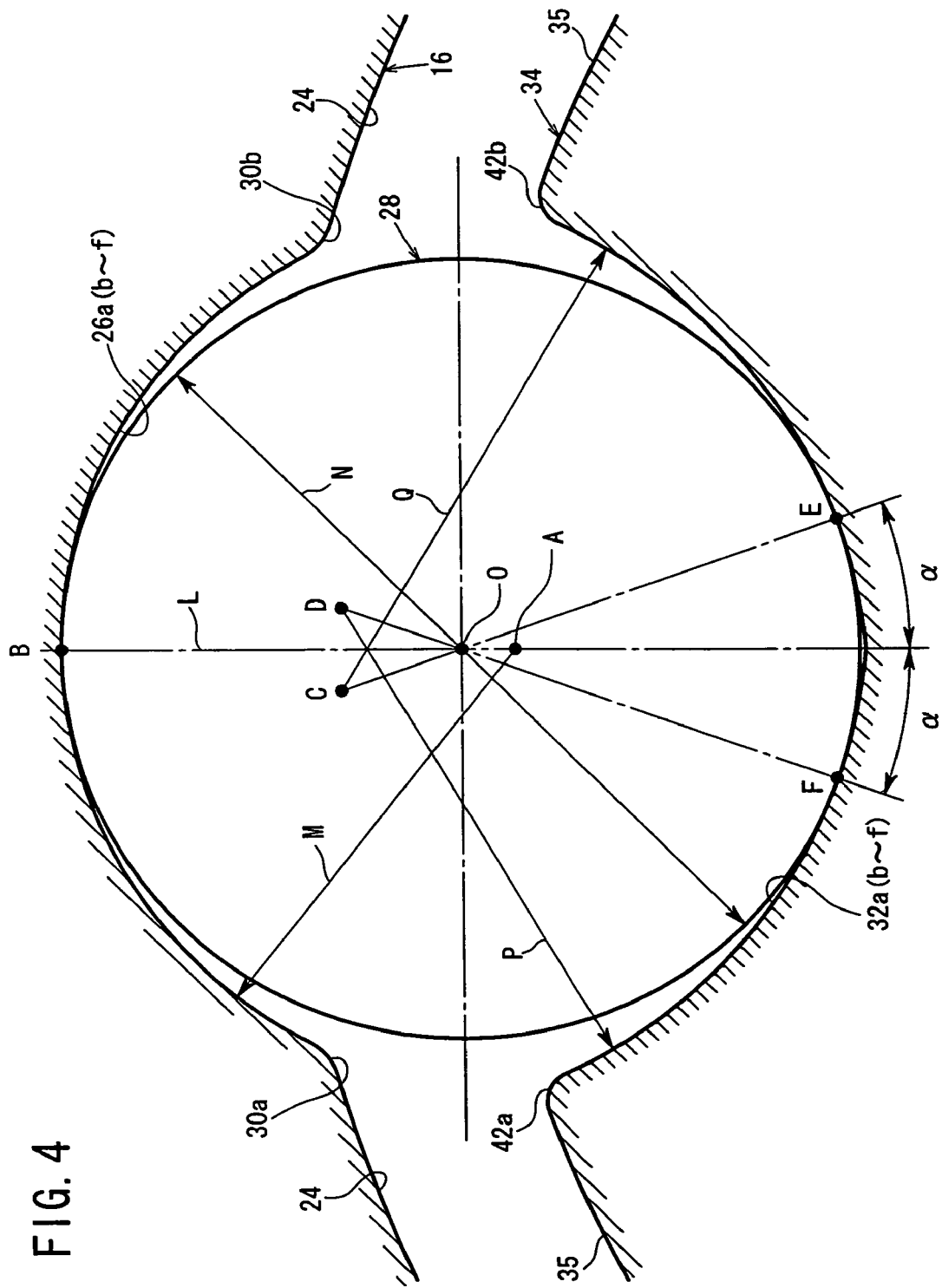
FIG. 4 is an enlarged fragmentary transverse cross-sectional view, taken along a direction perpendicular to the axial direction, of the constant-velocity joint shown in FIG. 1.

As shown in FIG. 4, each of the first guide grooves 26a through 26f defined in the outer cup 16 has a transverse cross section having a single arcuate shape whose center A of curvature is placed on a vertical line L that extends through the center O of the ball 28. Each of the first guide grooves 26a through 26f is held in contact with the outer surface of the ball 28 at a single point B in FIG. 4.

When a load is actually applied to transmit a rotational torque, the outer surface of the ball 28 and each of the first guide grooves 26a through 26f are held in surface-to-surface contact, rather than point-to-point contact, with each other.

The inside-diameter surface 24 is continuously formed on both sides of each of the first guide grooves 26a through 26f in the transverse cross section. The boundaries between the edges of each of the first guide grooves 26a through 26f and the inside-diameter surface 24 have a pair of first shoulders 30a, 30b that are beveled.

The contact angle of the ball 28 with respect to each of the first guide grooves 26a through 26f of the outer cup 16 is set to zero on the vertical line L. The ratio (M/N) of the radius M of each of the first guide grooves 26a through 26f in the transverse cross section to the diameter N of the ball 28 may be set to a value in the range from 0.51 to 0.55 (see FIG. 4).

The inner member 22 has an inner ring 34 having a plurality of second guide grooves 32a through 32f defined in the outer circumferential surface thereof and spaced circumferentially in alignment with the respective first guide grooves 26a through 26f, a plurality of balls 28 (six in the present embodiment) rollingly disposed between the first guide grooves 26a through 26f defined in the inner wall surface of the outer cup 16 and the second guide grooves 32a through 32f defined in an outside-diameter surface 35 (see FIG. 4) of the inner ring 34, for performing a function to transmit a rotational torque, and a retainer 38 having a plurality of retaining windows 36 defined therein and spaced in the circumferential direction for retaining the balls 28, respectively, therein, and interposed between the outer cup 16 and the inner ring 34.

The inner ring 34 is splined to an end of the second shaft 18 through a central hole defined therein, or is integrally fixed to the end of the second shaft 18 by a ring-shaped locking member 40 that is mounted in an annular groove defined in the second shaft 18. The second guide grooves 32a through 32f, which are disposed in alignment with the respective first guide grooves 26a through 26f of the outer cup 16 and spaced at equal angular intervals in the circumferential direction, are defined in the outside-diameter surface 35 of the inner ring 34.

As shown in FIG. 2, the second guide grooves 32a through 32f, each having a curved axial longitudinal cross section and defined in the inner ring 34, have a common center of curvature at a point R. The point R is in a position that is offset a distance T2 from the center K of the spherical inside-diameter surface 24 (where the hypothetical plane interconnecting the centers O of balls 28 [ball center plane] and the joint axis 27 intersect) in the axial direction.

The point H at the center of curvature of the first guide grooves 26a through 26f and the point R at the center of curvature of the second guide grooves 32a through 32f are disposed in the respective positions that are offset in opposite directions from the center K of the spherical inside-diameter surface 24 (where the ball center plane and the joint axis 27 intersect) by equal distances (T1=T2) in the axial direction. The point H is positioned closer to the opening 14 of the outer cup 16 than the center K of the spherical inside-diameter surface 24, and the point R is positioned closer to an inner end 46 of the outer cup 16. The radius of curvature from the point H and the radius of curvature from the point R extend across each other (see FIG. 2).

If it is assumed that the balls 28 have a diameter N and the centers (the points H, R) of curvature of the first guide grooves 26a through 26f and the second guide grooves 32a through 32f are axially offset a distance T from the center K, then the diameter N of the balls 28 and the offset distance T should preferably be set such that the ratio V (=T/N) of the distance T to the diameter N satisfies the expression: $0.12 \leq V \leq 0.14$.

As shown in FIG. 4, each of the second guide grooves 32a through 32f has a transverse cross section of an elliptically arcuate shape having a pair of centers C, D that are spaced a predetermined distance horizontally from each other. Each of the second guide grooves 32a through 32f is held in contact with the outer surface of the ball 28 at two points E, F in FIG. 4. When a load is actually applied to transmit a rotational torque, the outer surface of the ball 28 and each of the second guide grooves 32a through 32f are held in surface-to-surface contact, rather than point-to-point contact, with each other.

The outside-diameter surface 35 is continuously formed on both sides of each of the second guide grooves 32a through 32f in the transverse cross section. The boundaries between the edges of each of the second guide grooves 32a through 32f and the outside-diameter surface 35 have a pair of second shoulders 42a, 42b that are beveled.

Figure 7:
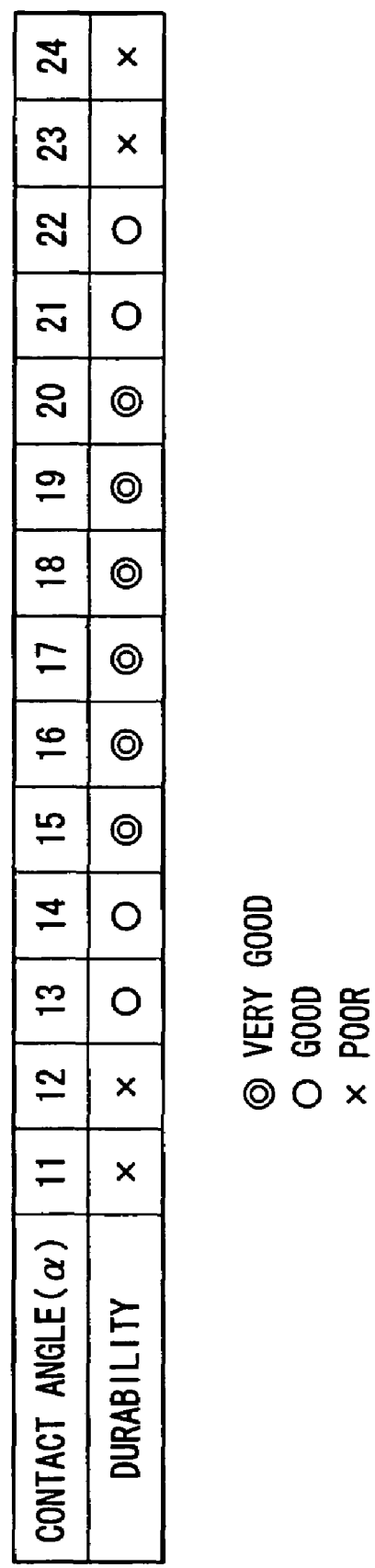
FIG. 7 is a diagram showing the relationship between durability and the contact angle between a second guide groove and a ball.

The ball 28 is held in contact with each of the second guide grooves 32a through 32f at a contact angle α on each side of the vertical line L. If the contact angle α is set to an angle in the range from 13 degrees to 22 degrees, as shown in FIG. 7, then durability of the constant-velocity joint increases. If the contact angle α is set to an angle in the range from 15 degrees to 20 degrees, then durability of the constant-velocity joint further increases. The ratios (P/N, Q/N) of the radiuses P, Q of each of the second guide grooves 32a through 32f in the transverse cross section to the diameter N of the ball 28 may be set to a value in the range from 0.51 to 0.55 (see FIG. 4).

The balls 28 are made of steel, for example, and are rollingly disposed in the respective first guide grooves 26a through 26f of the outer cup 16 and the respective second guide grooves 32a through 32f of the inner ring 34. The balls 28 transmit the rotational torque of the second shaft 18 through the inner ring 34 and the outer cup 16 to the first shaft 12, and roll in and along the first guide grooves 26a through 26f and the second guide grooves 32a through 32f, thereby allowing the second shaft 18 (the inner ring 34) and the first shaft 12 (the outer cup 16) to be angularly displaced relative to each other. Rotational torque can be transmitted in either direction between the first shaft 12 and the second shaft 18.

Figure 8:
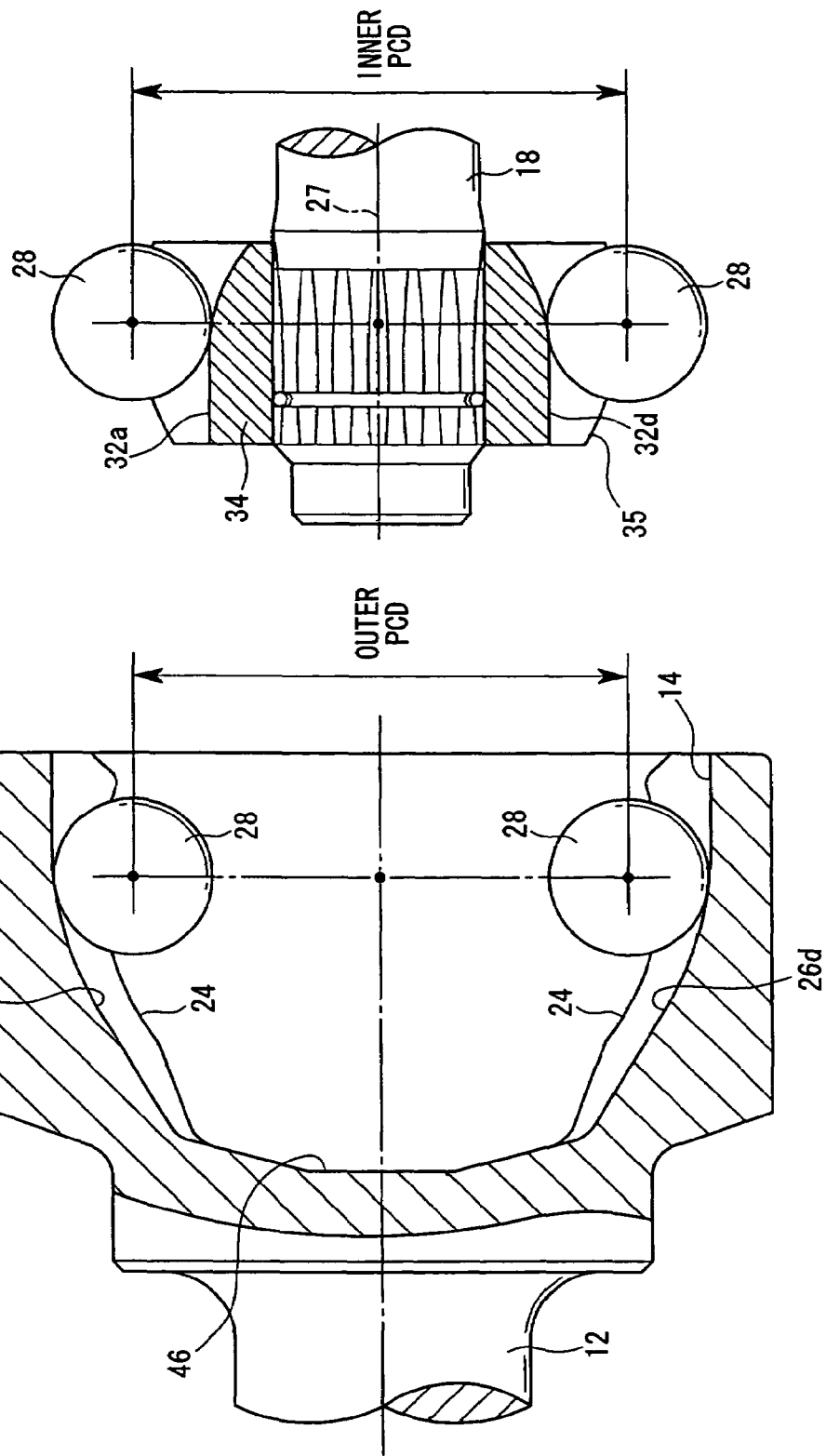
FIG. 8A is a longitudinal cross-sectional view showing an outer PCD, which is the pitch circle diameter of a first guide groove defined in an outer cup.
FIG. 8B is a longitudinal cross-sectional view showing an inner PCD, which is the pitch circle diameter of a second guide groove defined in an inner ring.

As shown in FIGS. 8A and 8B, if the pitch circle diameter of the first guide grooves 26a through 26f, at the time the six balls 28 are held in point-to-point contact with the first guide grooves 26a through 26f, is represented as an outer PCD, and the pitch circle diameter of the second guide grooves 32a through 32f, at the time the six balls 28 are held in point-to-point contact with the second guide grooves 32a through 32f, is represented as an inner PCD, then a PCD clearance is established as the difference between the outer PCD and the inner PCD (outer PCD−inner PCD).

Figure 9:
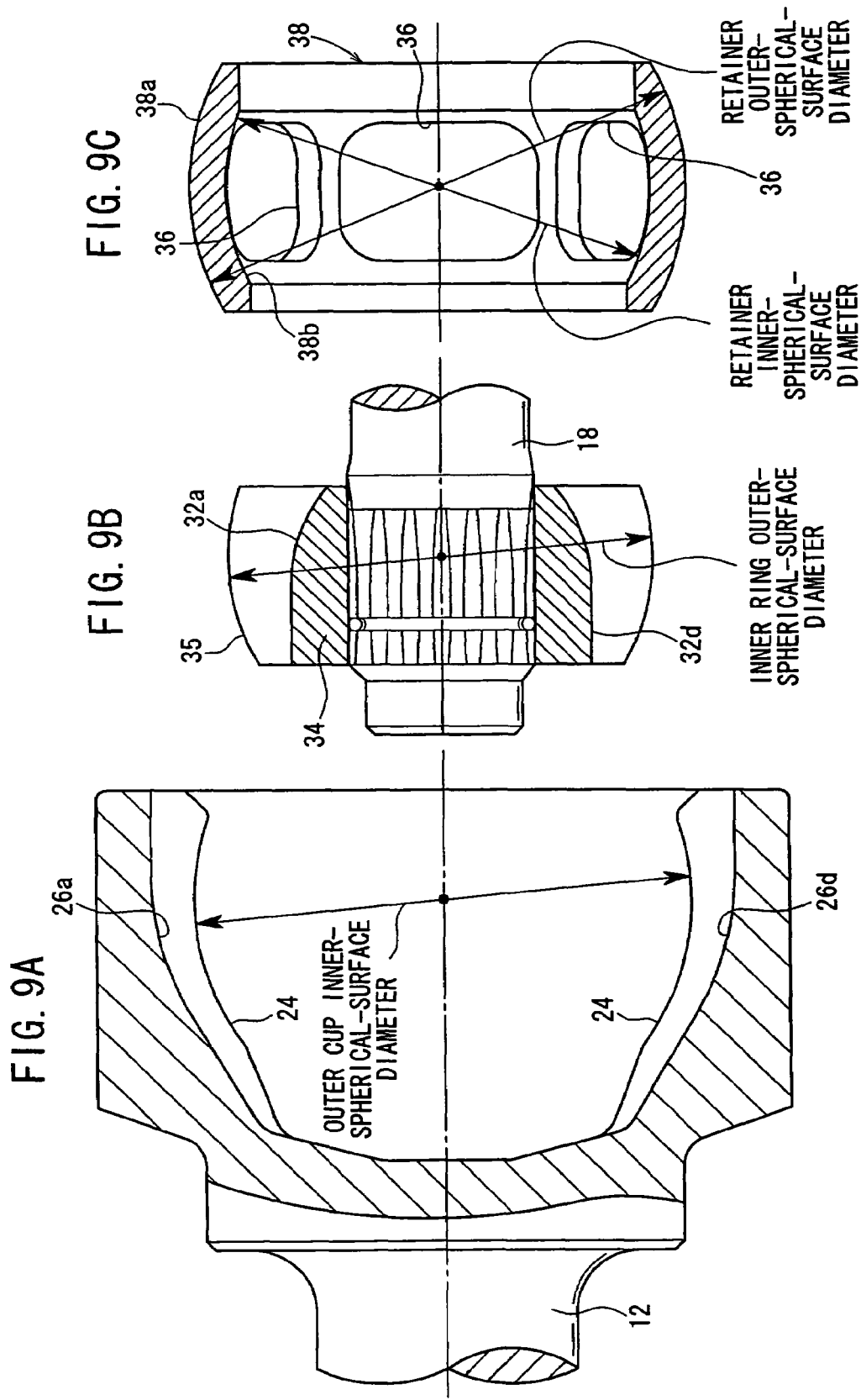
FIG. 9A is a longitudinal cross-sectional view showing an outer cup inner-spherical-surface diameter, which is the diameter of the inside-diameter surface of the outer cup.
FIG. 9B is a longitudinal cross-sectional view showing an inner ring outer-spherical-surface diameter, which is the diameter of the outside-diameter surface of the inner ring.
FIG. 9C is a longitudinal cross-sectional view showing a retainer outer-spherical-surface diameter, which is the diameter of the outer surface of a retainer, and a retainer inner-spherical-surface diameter, which is the diameter of the inner surface of the retainer.

As shown in FIGS. 9A through 9C, a spherical clearance is established as the sum of the difference between the outer cup inner-spherical-surface diameter, which is the diameter of the inside-diameter surface 24 of the outer cup 16, and the retainer outer-spherical-surface diameter, which is the diameter of the outside-diameter surface of the retainer 38, and the difference between the retainer inner-spherical-surface diameter, which is the diameter of the inside-diameter surface of the retainer 38, and the inner ring outer-spherical-surface diameter, which is the diameter of the outside-diameter surface of the inner ring 34.

That is, the spherical clearance is given by the following expression: Spherical Clearance={(the outer cup inner-spherical-surface diameter)−(the retainer outer-spherical-surface diameter)}+{(the retainer inner-spherical-surface diameter)−(the inner ring outer-spherical-surface diameter)}.

Figure 10:
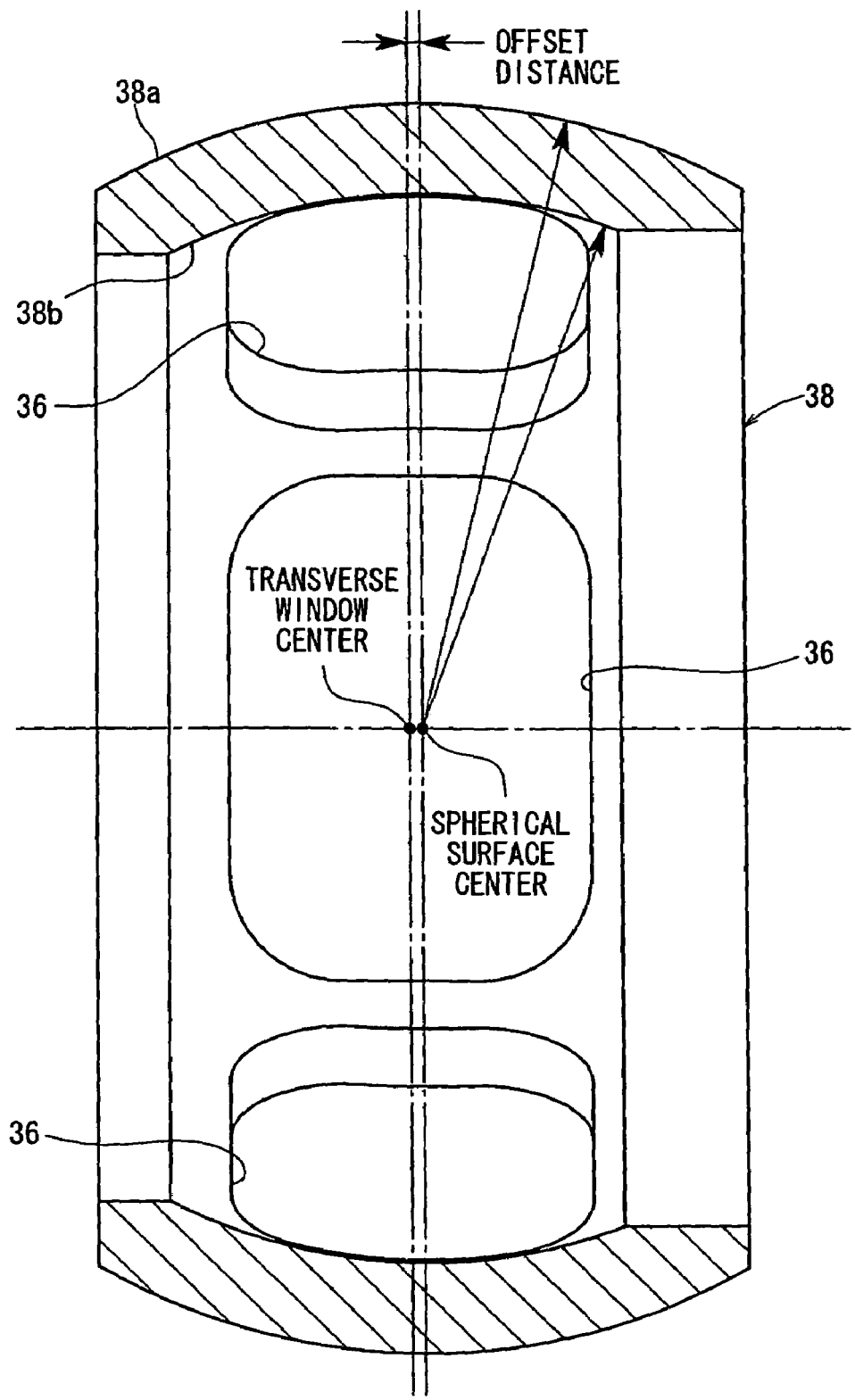
FIG. 10 is a longitudinal cross-sectional view showing the distance by which the transverse center of retaining windows of the retainer is offset from the center of the spherical inner and outer surfaces of the retainer.

As shown in FIG. 10, the transverse center ("transverse" here refers to the axial direction of the retainer 38) of the retaining windows 36 of the retainer 38 is offset a predetermined distance from the center of the spherical outer and inner surfaces 38a, 38b of the retainer 38 in the axial direction of the retainer 38.

The constant-velocity joint 10 according to the present embodiment is basically constructed as described above. Next, operations and advantages of the constant-velocity joint 10 shall be described below.

When the second shaft 18 rotates about its own axis, the rotational torque thereof is transmitted from the inner ring 34 through the balls 28 to the outer cup 16, causing the first shaft 12 to rotate in the same direction and at the same velocity as the second shaft 18.

If the first shaft 12 and the second shaft 18 are angularly displaced with respect to each other, the balls 28 roll between the first guide grooves 26a through 26f and the second guide grooves 32a through 32f to tilt the retainer 38 through a certain angle, allowing the first shaft 12 and the second shaft 18 to be angulated relative to each other.

At this time, the six balls 28 retained in the retaining windows 36 of the retainer 38 are positioned on a constant-velocity plane or a bisecting angle plane between the first and second shafts 12, 18, keeping drive contact points on the constant-velocity plane at all times to provide constant-velocity transmission. In this manner, the first shaft 12 and the second shaft 18 are rotated at a constant velocity and are appropriately angularly displaced with respect to each other.

According to the present embodiment, the ratio V (=T/N) of the diameter N of the balls 28 to the distance T by which the centers (the points H, R) of curvature of the first guide grooves 26a through 26f and the second guide grooves 32a through 32f are axially offset from the center K is set to satisfy the expression 0.12≦V≦0.14 (see FIG. 2).

If the ratio V of the diameter N to the offset distance T is less than 0.12, then the funnel angle formed between the first guide grooves 26a through 26f and the second guide grooves 32a through 32f is minimized, allowing the balls 28 to be easily locked when the constant-velocity joint 10 is not in rotation, and also resulting in a reduction in the efficiency with which the constant-velocity joint 10 is assembled.

Conversely, if the ratio V of the diameter N to the offset distance T is in excess of 0.14, then since the first guide grooves 26a through 26f and the second guide grooves 32a through 32f are made shallow, the balls 28 are easily liable to move onto or crack and wear the first shoulders 30a, 30b at the edges of the first guide grooves 26a through 26f, as well as the second shoulders 42a, 42b at the edges of the second guide grooves 32a through 32f.

By thus setting the ratio V of the diameter N to the offset distance T to satisfy the range of 0.12≦V≦0.14, the balls 28 are effectively prevented from moving onto or cracking and wearing the first shoulders 30a, 30b at the edges of the first guide grooves 26a through 26f and the second shoulders 42a, 42b at the edges of the second guide grooves 32a through 32f, thereby making the constant-velocity joint 10 more durable.

Figure 5:
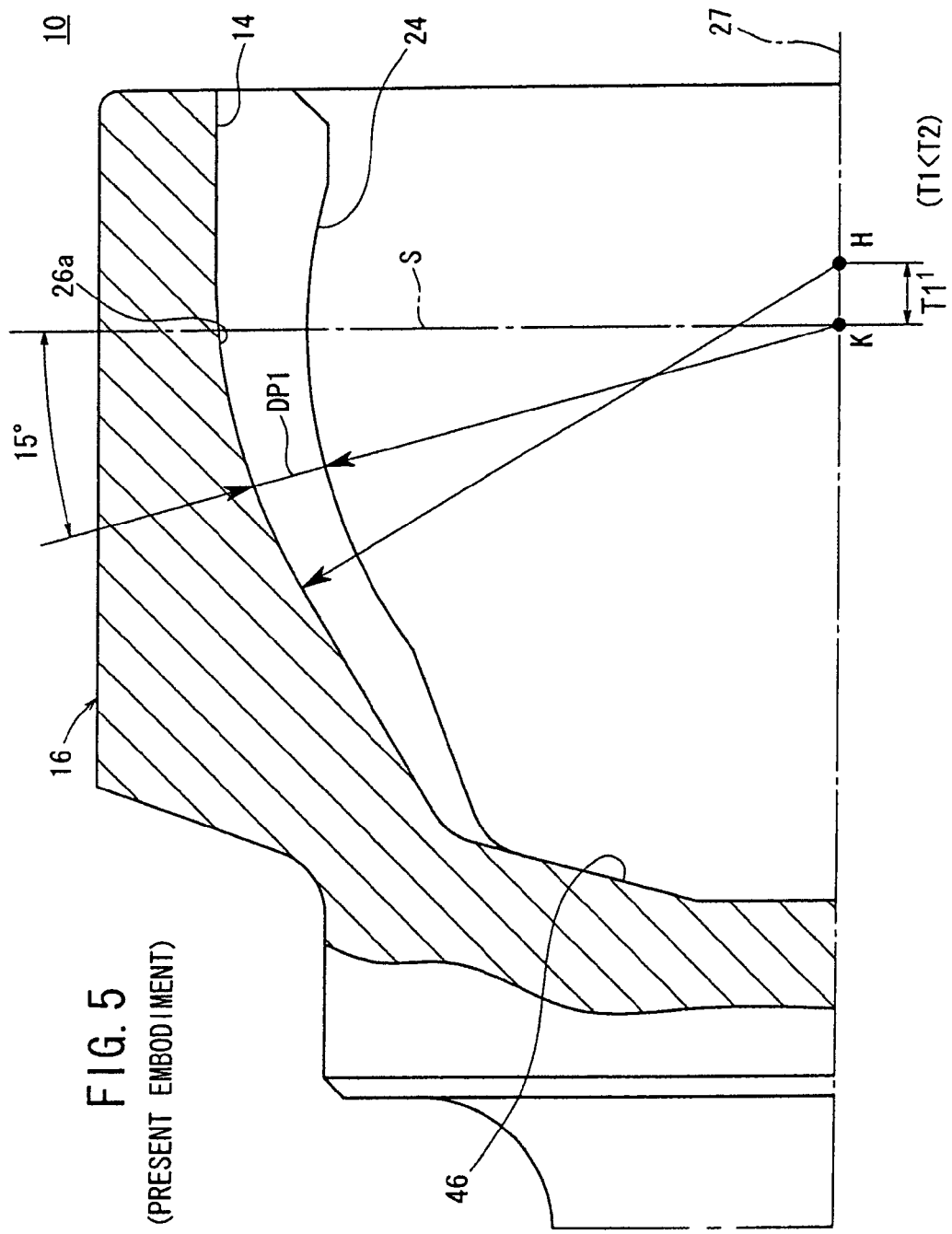
FIG. 5 is an enlarged fragmentary longitudinal cross-sectional view showing the depth of a first guide groove of the constant-velocity joint according to the embodiment.
Figure 6:
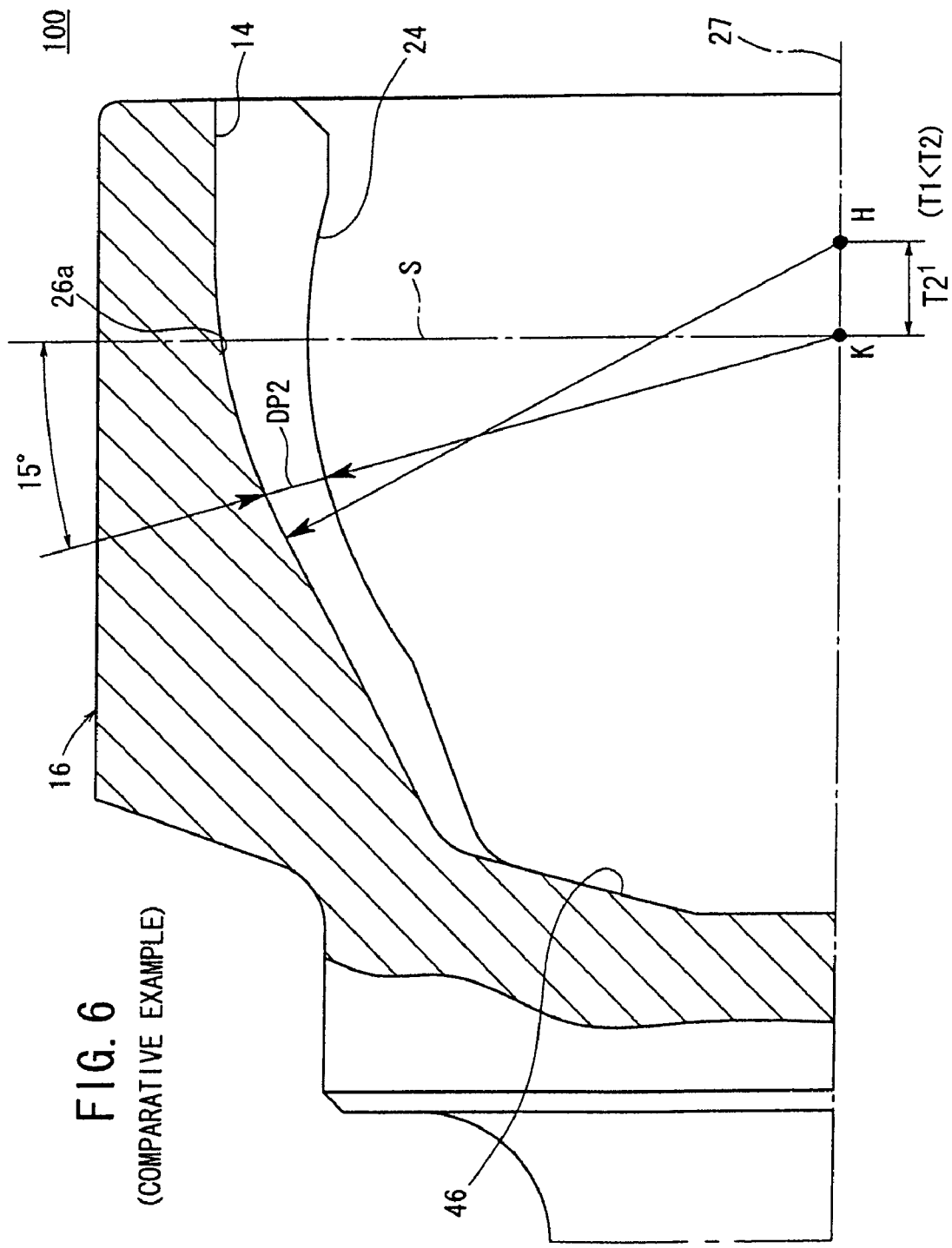
FIG. 6 is an enlarged fragmentary longitudinal cross-sectional view showing the depth of a first guide groove of a constant-velocity joint according to a comparative example.

FIG. 5 shows in enlarged fragmentary longitudinal cross section the constant-velocity joint 10 according to the embodiment. As shown in FIG. 5, the ratio V of the diameter N to the offset distance T is set to satisfy the range of 0.12≦V≦0.14, thereby making an offset distance T1' small. FIG. 6 shows in enlarged fragmentary longitudinal cross section of a constant-velocity joint 100 according to a comparative example. As shown in FIG. 6, an offset distance T2' of the constant-velocity joint 100 is larger than the offset distance T1' of the constant-velocity joint 10 (T1'<T2').

Comparison between the constant-velocity joints 10, 100 for the depth of the first guide grooves 26a through 26f in regions that are about 15 degrees inclined to a straight line S extending perpendicular to the joint axis 27 and passing through the centers of the balls 28, indicates that the depth DP1 of the first guide grooves 26a through 26f of the constant-velocity joint 10 according to the embodiment is greater than the depth DP2 of the first guide grooves 26a through 26f of the constant-velocity joint 100 according to the comparative example (DP1>DP2). Therefore, with the constant-velocity joint 10 according to the embodiment, the balls 28 are effectively prevented from moving onto or cracking and wearing the first shoulders 30a, 30b at the edges of the first guide grooves 26a through 26f, and the second shoulders 42a, 42b at the edges of the second guide grooves 32a through 32f.

According to the present embodiment, furthermore, each of the first guide grooves 26a through 26f defined in the outer cup 16 has a transverse cross section having an arcuate shape which is held in contact with the balls 28 at a single point, and each of the second guide grooves 32a through 32f has an elliptically arcuate transverse cross section which is held in contact with the balls 28 at two points. With this arrangement, the surface pressure applied to the first guide grooves 26a through 26f and the second guide grooves 32a through 32f by contact with the balls 28 is made lower than with the conventional arrangement, for increased durability.

According to the present embodiment, each of the ratios (M/N, P/N, Q/N) of the groove radiuses (M, P, Q) to the diameter N of the balls 28 in the transverse cross section of the first guide grooves 26a through 26f and the second guide grooves 32a through 32f is set to a value in the range from 0.51 to 0.55, the contact angle of the balls 28 with respect to each of the first guide grooves 26a through 26f is set to zero on the vertical line L, and the contact angles α of the balls 28 held in contact with each of the second guide grooves 32a through 32f are set to a value in the range from 13 degrees to 22 degrees, thereby reducing the surface pressure for increased durability.

The reasons why each of the ratios (M/N, P/N, Q/N) of the groove radiuses (M, P, Q) to the diameter N of the balls 28 in the transverse cross section of the first guide grooves 26a through 26f and the second guide grooves 32a through 32f is set to a value in the range from 0.51 to 0.55, are that if the ratio is less than 0.51, then since the groove radiuses (M, P, Q) and the diameter N of the balls 28 are too close to each other, the balls 28 are approximately in full contact with the guide grooves and are less liable to roll, resulting in poor durability, and if the ratio is greater than 0.55, then since the contact ellipse of the balls 28 is reduced, the contact surface pressure is increased, resulting in poor durability.

The ratio V (T/N) of the diameter N of the balls 28 to the distance T by which the centers (points H, R) of curvature of the first guide grooves 26a through 26f and the second guide grooves 32a through 32f in the longitudinal cross section are axially offset from the center K, the contact angles α of the balls 28 held in contact with each of the second guide grooves 32a through 32f, and the ratio of the groove radiuses (M, P, Q) to the diameter N of the balls 28 in the transverse cross section of the first guide grooves 26a through 26f and the second guide grooves 32a through 32f are determined to be of optimum values as a result of repeated simulations and experiments.

The reasons why the contact angles α of the balls 28 held in contact with each of the second guide grooves 32a through 32f are set to a value in the range from 13 degrees to 22 degrees are that if the contact angles α are smaller than 13 degrees, then the load on the balls 28 is increased thereby to increase the surface pressure, resulting in reduced durability, and if the contact angles α are greater than 22 degrees, the edges (the second shoulders 42a, 42b) of the second guide grooves 32a through 32f and the contact positions of the balls 28 are brought closely to each other, and the contact ellipse of the balls protrudes from the guide grooves thereby to increase the surface pressure, resulting in reduced durability.

Figure 11:
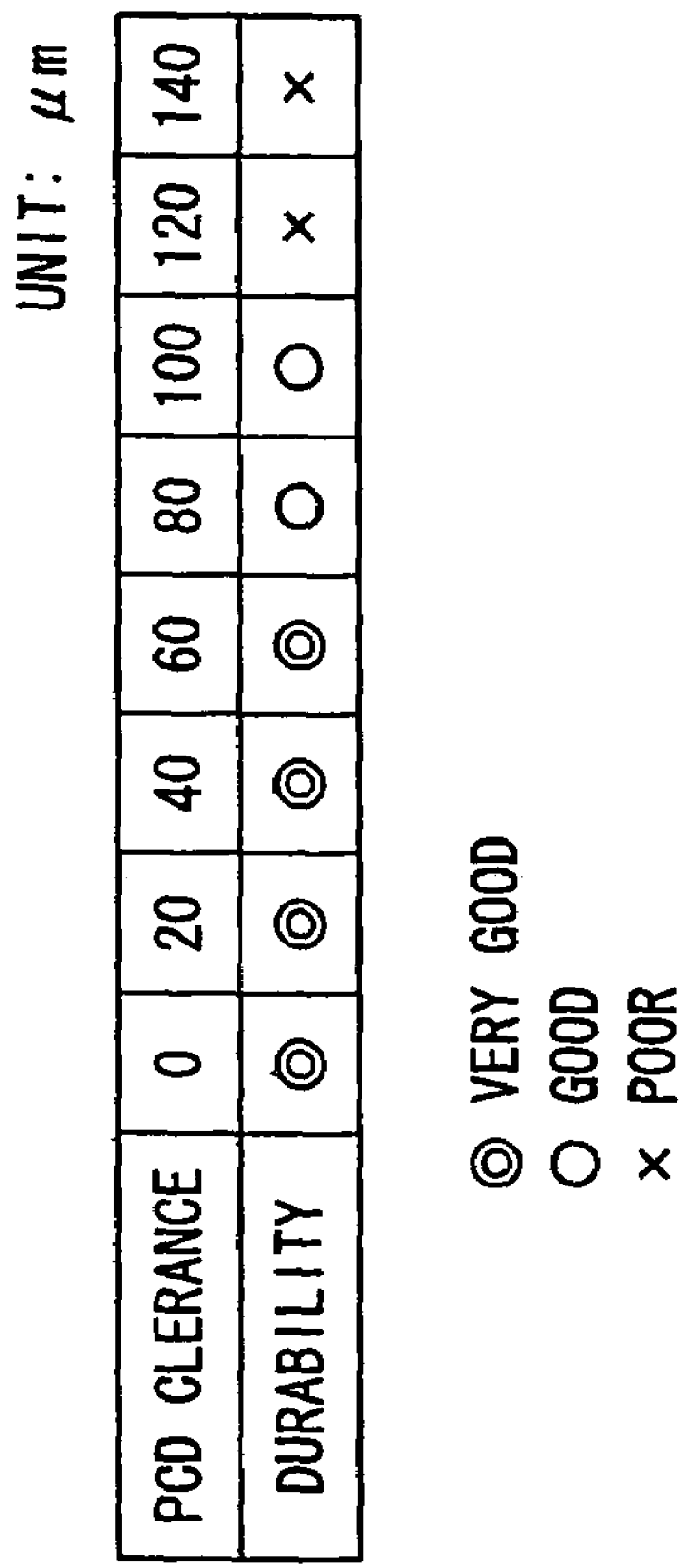
FIG. 11 is a diagram showing the relationship between the PCD clearance and durability.

According to the present embodiment, furthermore, the PCD clearance that is established as the difference between the outer PCD and the inner PCD (outer PCD−inner PCD) (see FIGS. 8A and 8B) should be set to a value ranging from 0 to 100 μm, or preferably from 0 to 60 μm. The PCD clearance should be in the range from 0 to 100 μm because if the PCD clearance is smaller than 0 μm, then the balls 28 cannot be assembled in place efficiently and cannot roll smoothly, resulting in poor durability, and if the PCD clearance is in excess of 100 μm, then the contact ellipse of the balls 28 held in contact with the first and second guide grooves protrudes from the shoulders at the groove edges, increasing the surface pressure and cracking the shoulders, with the result that durability is lowered. If the PCD clearance is set in the range from 0 to 60 μm, then very good durability is achieved as indicated by the experimental results shown in FIG. 11.

Figure 12:
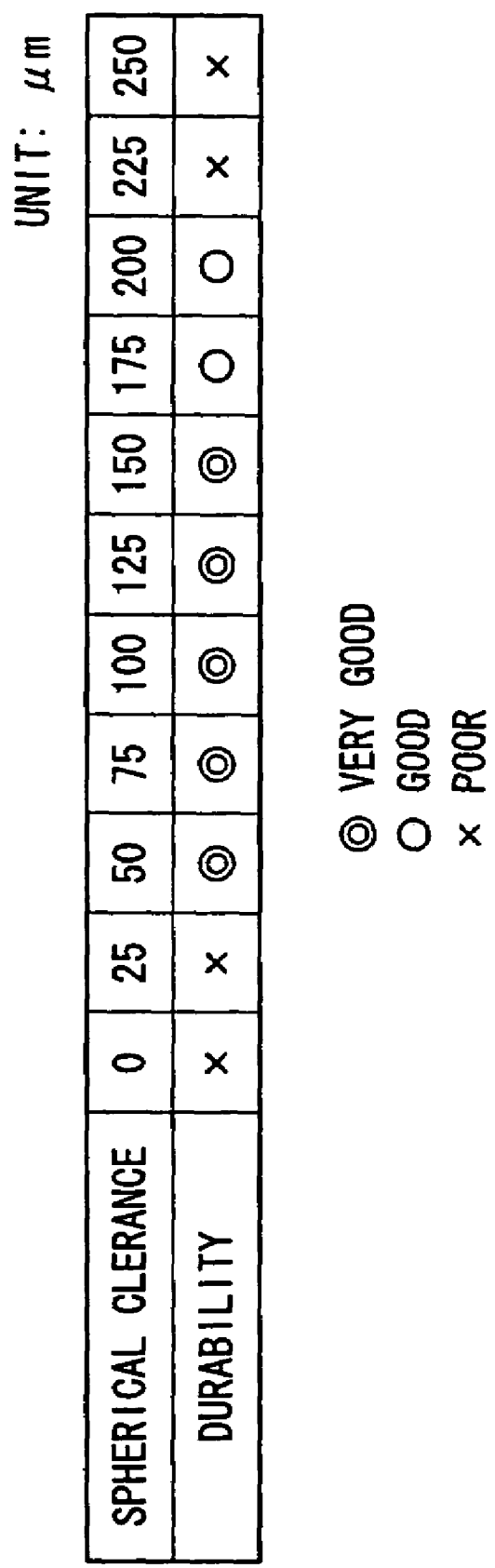
FIG. 12 is a diagram showing the relationship between the spherical clearance and durability.

Furthermore, according to the present embodiment, as shown in FIGS. 9A through 9C, the spherical clearance defined as {(outer cup inner-spherical-surface diameter)−(retainer outer-spherical-surface diameter)}+{(retainer inner-spherical-surface diameter)−(inner ring outer-spherical-surface diameter)} should be set to a value in the range from 50 to 200 μm, or preferably from 50 to 150 μm. If the spherical clearance is less than 50 μm, then seizure will be caused due to a lubrication failure between the inner surface of the outer cup 16 and the outer surface 38a of the retainer 38, and also between the outer surface of the inner ring 34 and the inner surface 38b of the retainer 38, adversely affecting the mechanism of the constant-velocity joint 10. If the spherical clearance is greater than 200 μm, then striking noise will be generated between the outer cup 16 and the inner ring 34, and the retainer 38, adversely affecting the commercial value of the constant-velocity joint 10. If the spherical clearance is set in the range from 50 to 150 μm, then very good durability is achieved as indicated by the experimental results shown in FIG. 12.

Figure 13:
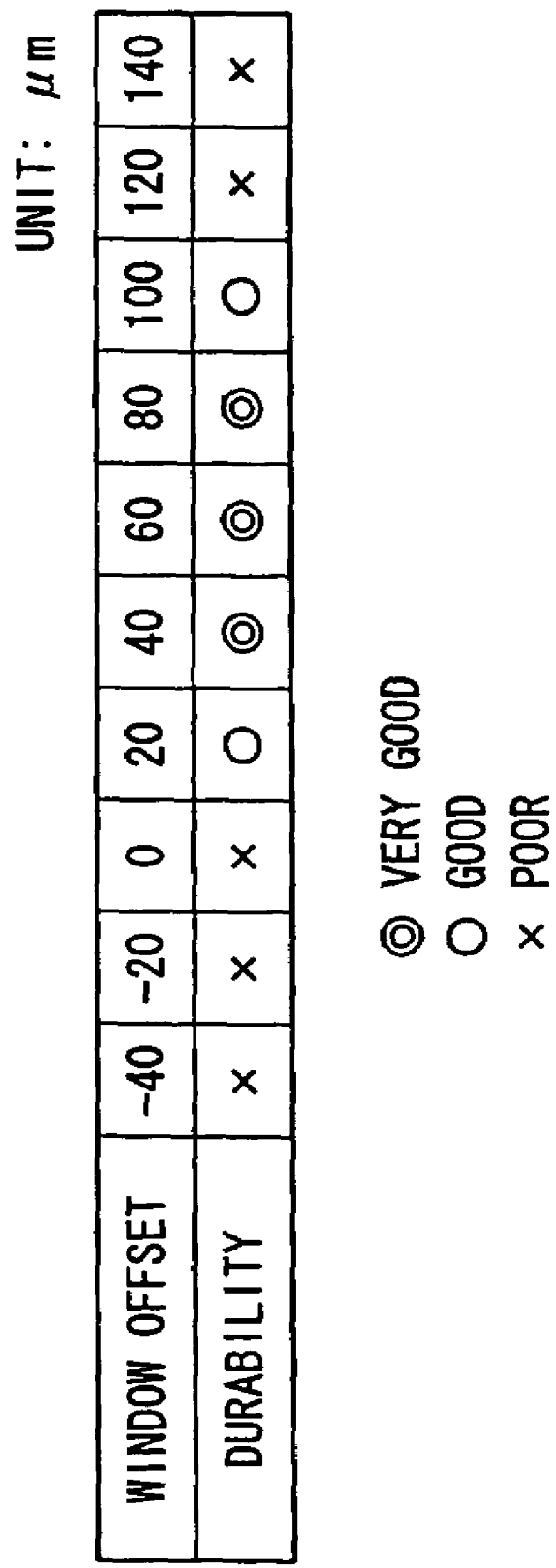
FIG. 13 is a diagram showing the relationship between the window offset and durability.

According to the present embodiment, as shown in FIG. 10, the transverse center ("transverse" here refers to the axial direction of the retainer 38) of the retaining windows 36 of the retainer 38 is offset from the center of the spherical outer and inner surfaces 38a, 38b of the retainer 38 in the axial direction of the retainer 38, by a distance ranging from 20 to 100 μm. If the distance by which the transverse center of the retaining windows 36 of the retainer 38 is offset from the center of the spherical outer and inner surfaces 38a, 38b is smaller than 20 μm, then restraint forces applied to the balls 28 will be not large enough to maintain a constant-velocity transmission capability. If the distance by which the transverse center of the retaining windows 36 of the retainer 38 is offset from the center of the spherical outer and inner surfaces 38a, 38b is greater than 100 μm, then restraint forces applied to the balls 28 will be too large for the balls 28 to roll smoothly, resulting in poor durability. If the distance by which the transverse center of the retaining windows 36 of the retainer 38 is offset from the center of the spherical outer and inner surfaces 38a, 38b is set in the range from 40 to 80 μm, then very good durability is achieved, as indicated by the experimental results shown in FIG. 13.

As a consequence, even when the constant-velocity joint 10 with six balls 28 is placed under high loads, the contact ellipse of the balls 28 is prevented from protruding from the guide grooves, resulting in increased durability.

Settings for various dimensions of the constant-velocity joint 10 shall be described below.

It is assumed that the outer PCD and the inner PCD shown in FIGS. 8A and 8B are equal to each other (outer PCD=inner PCD), i.e., the difference between the outer PCD and the inner PCD is nil. Both the outer PCD and the inner PCD will hereinafter collectively be referred to as "outer/inner PCD".

Figure 14:
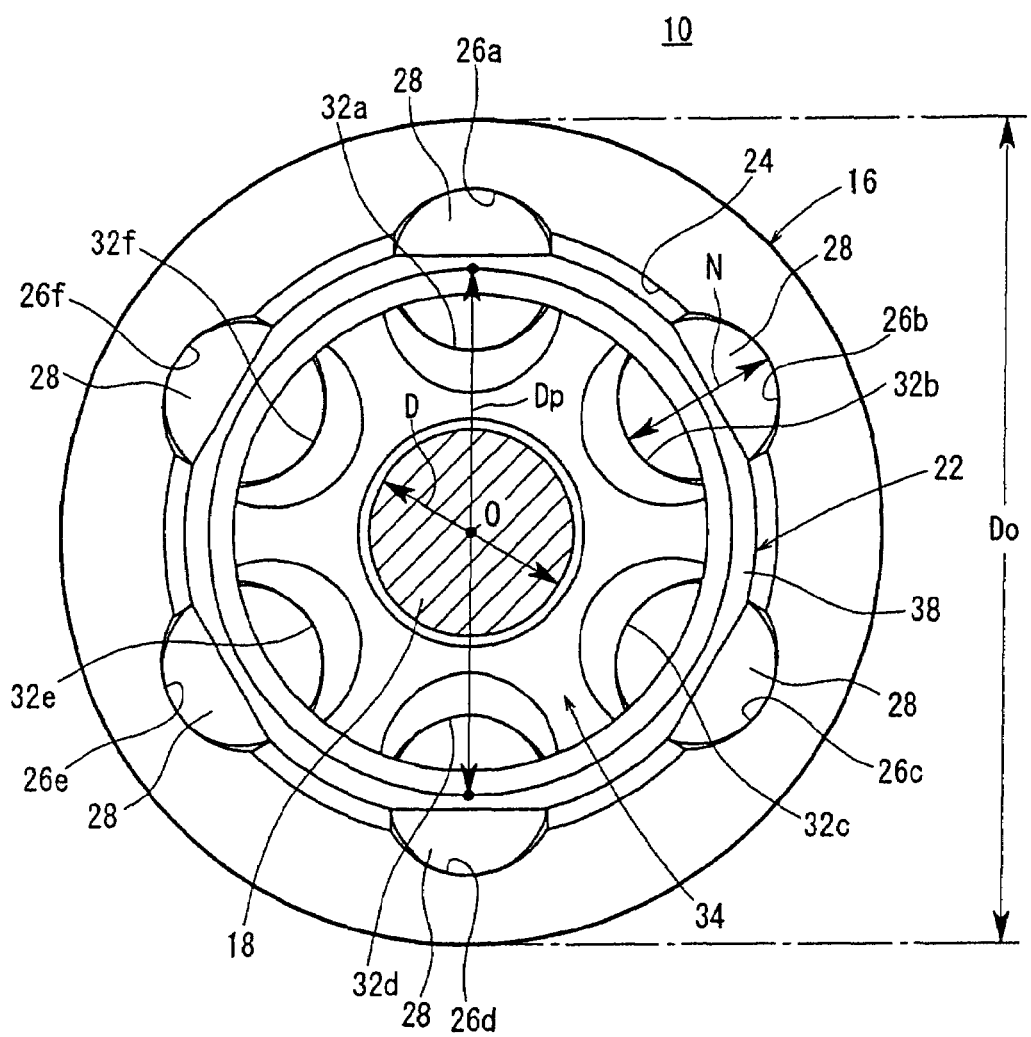
FIG. 14 is a side elevational view, partly in cross section, as seen in the axial direction indicated by the arrow X in FIG. 1, of the constant-velocity joint shown in FIG. 1.
Figure 15:
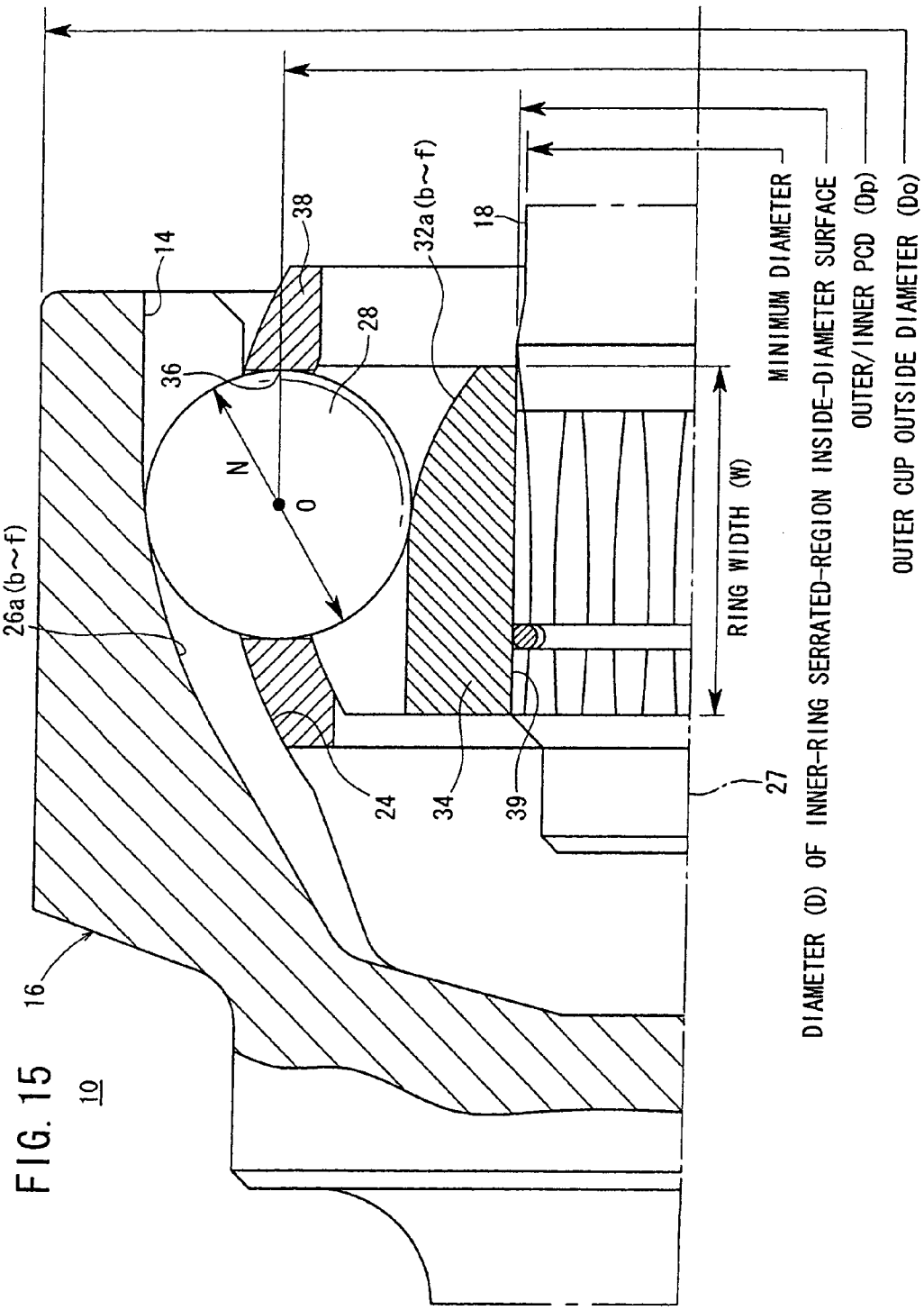
FIG. 15 is an enlarged fragmentary longitudinal cross-sectional view of the constant-velocity joint, showing a shaft serrated-region diameter (D), an outer/inner PCD (Dp), an outer cup outside diameter (Do), and a ball diameter (N)

The diameter (D) of an inner-ring serrated-region inside-diameter surface 39 is set to any desired value, and the dimension of the outer/inner PCD which represents a minimum wall thickness of the inner ring 34 is established based on the diameter (D) of the inner-ring serrated-region inside-diameter surface 39 (see FIGS. 14 and 15).

Figure 16:
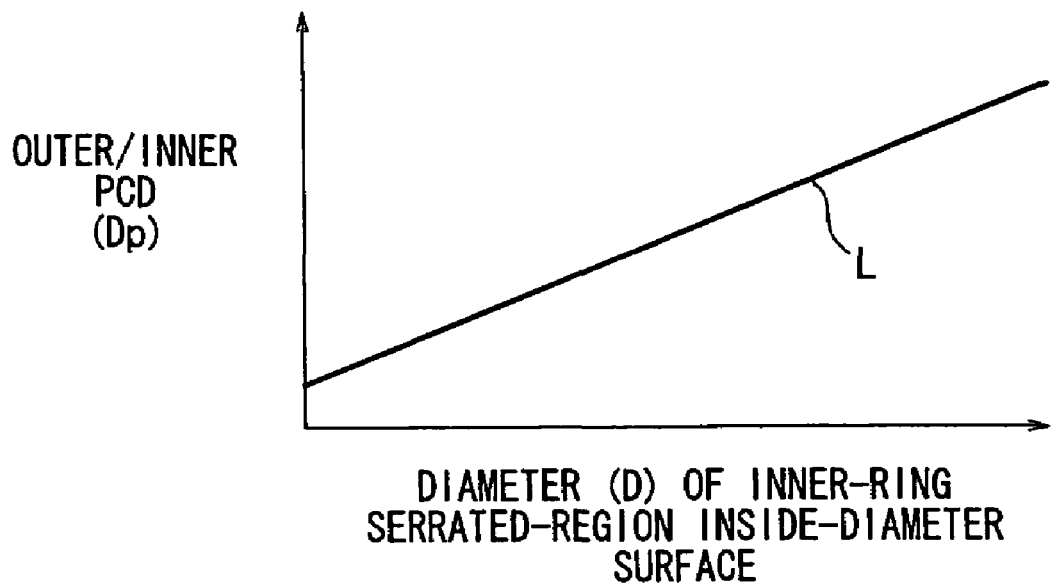
FIG. 16 is a diagram showing a characteristic linear curve L representing the relationship between the diameter of an inner-ring serrated-region inside-diameter surface and the outer/inner PCD.

The diameter (D) of the inner-ring serrated-region inside-diameter surface 39 refers to the dimension (maximum diameter) between the bottom of a valley in the inner-ring serrated-region inside-diameter surface 39 and the bottom of a diametrically opposite valley in the inner-ring serrated-region inside-diameter surface 39 across the center of the hole in the inner ring 34 (see FIG. 15). A predetermined joint strength is maintained by the minimum wall thickness of the inner ring 34. The value of the outer/inner PCD is determined from a characteristic linear curve L representing the relationship between the diameter of the inner-ring serrated-region inside-diameter surface 39 and the outer/inner PCD, as shown in FIG. 16.

If the diameter of the inner-ring serrated-region inside-diameter surface 39 is represented by D and the outer/inner PCD by Dp (see FIGS. 14 and 15), then the dimensional ratio (Dp/D) of the outer/inner PCD (Dp) to the diameter (D) of the inner-ring serrated-region inside-diameter surface 39 should preferably be set to a value in the range of $1.9 \leq (Dp/D) \leq 2.2$.

If the dimensional ratio (Dp/D) is less than 1.9, then the wall thickness of the inner ring 34 is too small, resulting in a reduction in the mechanical strength thereof. If the dimensional ratio (Dp/D) is in excess of 2.2, then the size of the constant-velocity joint 10 cannot be reduced.

Figure 17:
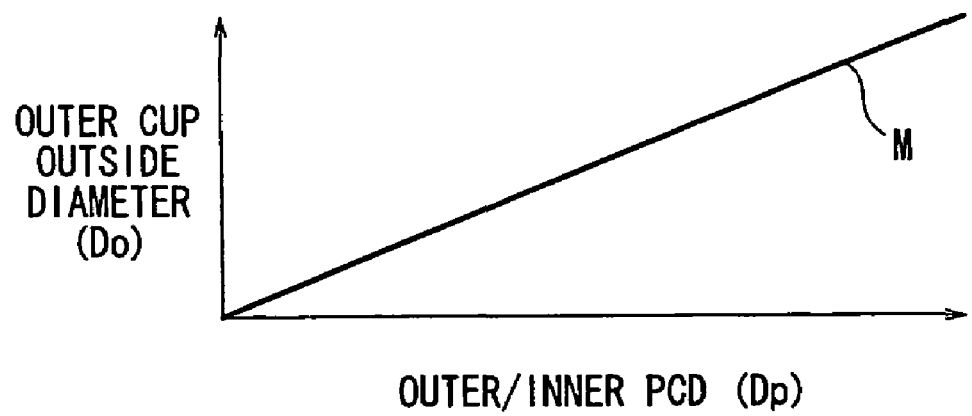
FIG. 17 is a diagram showing a characteristic linear curve M representing the relationship between the outer/inner PCD and the outside diameter of the outer cup.

As shown in FIG. 17, the outside diameter of the outer cup 16 is established based on a characteristic linear curve M representing the relationship between the outer/inner PCD and the outside diameter of the cup section of the outer cup 16. If the outside diameter of the outer cup 16 is represented by Do, then the dimensional ratio (Do/Dp) of the outside diameter Do of the outer cup 16 to the outer/inner PCD (Dp) should preferably be set to a value in the range of $1.4 \leq (Do/Dp) \leq 1.8$.

If the dimensional ratio (Do/Dp) is less than 1.4, then the wall thickness of the outer cup 16 is too small, resulting in a reduction in the mechanical strength thereof. If the dimensional ratio (Do/Dp) is in excess of 1.8, then the outside diameter of the outer cup 16 is increased, making it impossible to reduce the size of the constant-velocity joint 10.

Figure 18:
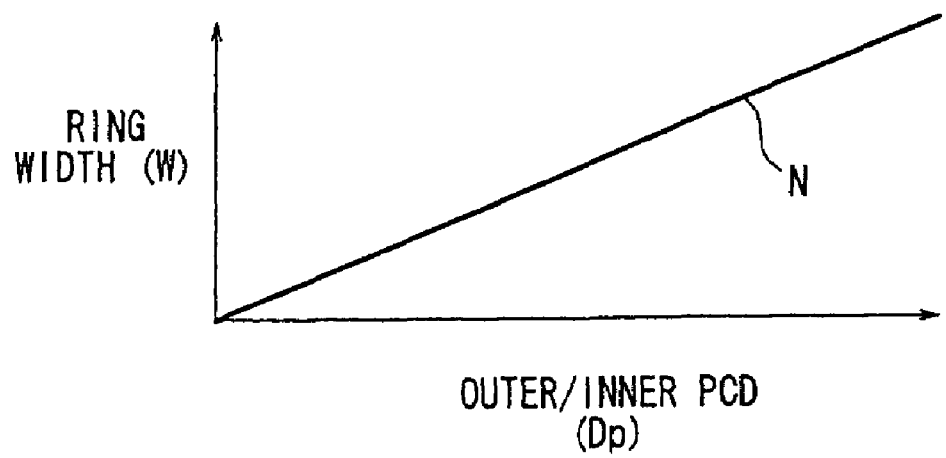
FIG. 18 is a diagram showing a characteristic linear curve N representing the relationship between the outer/inner PCD and the ring width of the inner ring.

As shown in FIG. 18, the ring width of the inner ring 34 is established based on a characteristic linear curve N representing the relationship between the outer/inner PCD and the ring width of the inner ring 34 along the axis of the second shaft 18. If the ring width of the inner ring 34 is represented by W, then the dimensional ratio (W/Dp) of the ring width W of the inner ring 34 to the outer/inner PCD (Dp) should preferably be set to a value in the range of $0.38 \leq (W/Dp) \leq 0.42$.

Figure 19:
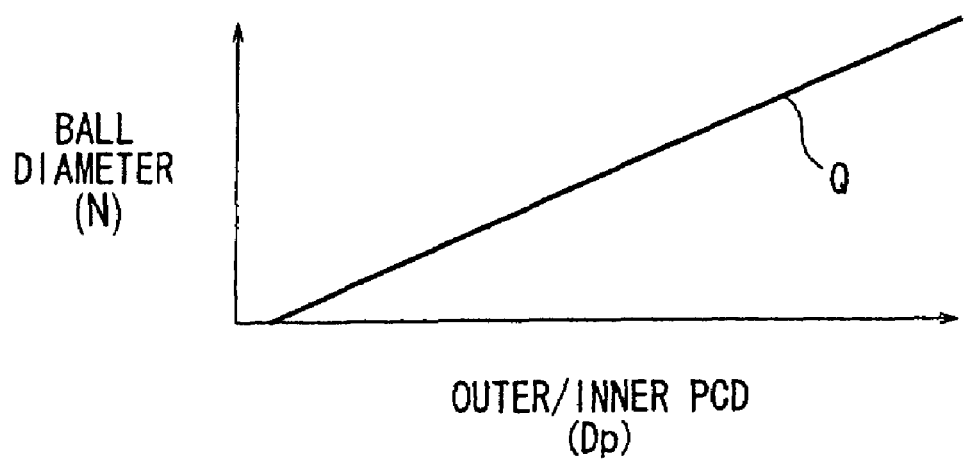
FIG. 19 is a diagram showing a characteristic linear curve Q representing the relationship between the outer/inner PCD and the ball diameter.

As shown in FIG. 19, the diameter of the balls 28 is established based on a characteristic linear curve Q representing the relationship between the outer/inner PCD (Dp) and the diameter of the balls 28. If the diameter of the balls 28 is represented by N as shown in FIGS. 14 and 15, then the dimensional ratio (N/Dp) of the diameter (N) of the balls 28 to the outer/inner PCD (Dp) should preferably be set to a value in the range of $0.2 \leq (N/Dp) \leq 0.5$.

If the dimensional ratio (N/Dp) is less than 0.2, then the diameter of the balls 28 is too small, resulting in a reduction in the mechanical strength thereof. If the dimensional ratio (N/Dp) is in excess of 0.5, then the balls 28 are so large that the wall thickness of the outer cup 16 is relatively small, resulting in a reduction in the mechanical strength thereof. The diameters of the spherical outer and inner surfaces 38a, 38b of the retainer 38, which retains the balls 28, are set to values depending on the layout thereof.

In this manner, the various dimensions of the constant-velocity joint 10 can be established for a small joint size while maintaining various characteristics, i.e., mechanical strength, durability, load capacity, etc., at desired levels.

The relation between an opening length (WL) in the circumferential direction of retaining windows 36 defined in the retainer 38 and a diameter (N) of balls 28 will be explained referring to FIGS. 20 through 23.

Figure 20:
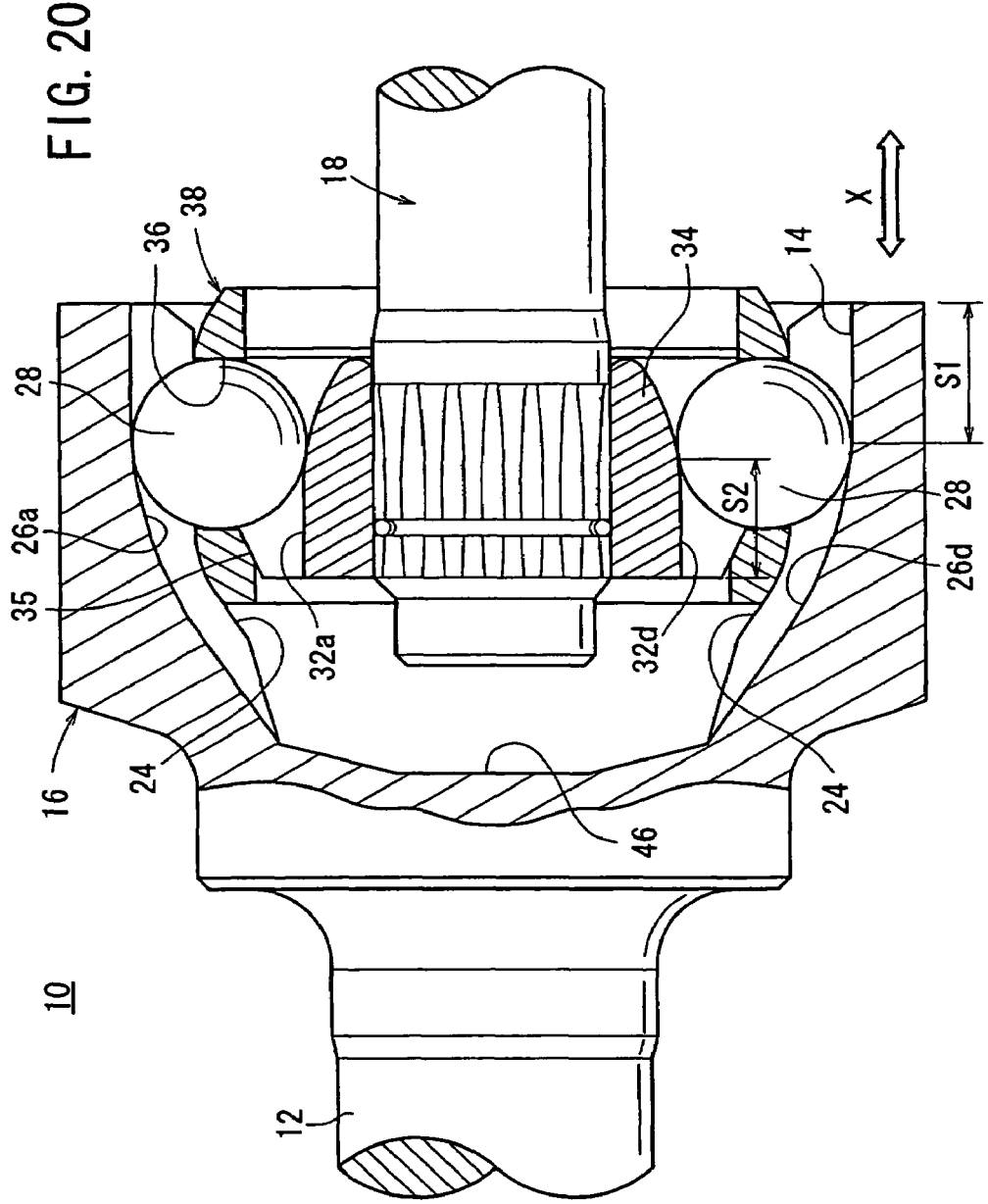
FIG. 20 is a longitudinal cross-sectional view, taken along an axial direction, of a constant-velocity joint in illustration of the relation between the retaining windows defined in a retainer and balls.

As shown in FIG. 20, the outer member 16 has an inside-diameter surface 24 having six first guide grooves 26a through 26f extending in the axial direction indicated by the arrow X and angularly spaced from each other by 60° around the axis thereof. Each of the first guide grooves 26a through 26f has a straight region S1 integrally extending from a curved region thereof in its longitudinal direction indicated by the arrow X.

The inner ring 34 has an outside-diameter surface 35 having as many second guide grooves 32a through 32f as the number of first guide grooves 26a through 26f, the second guide grooves 32a through 32f extending in the axial direction. Each of the second guide grooves 32a through 32f has a straight region S2 integrally extending from a curved region thereof in its longitudinal direction indicated by the arrow X. The straight regions S1, S2 are positioned opposite to each other in the direction indicated by the arrow X.

Figure 21:
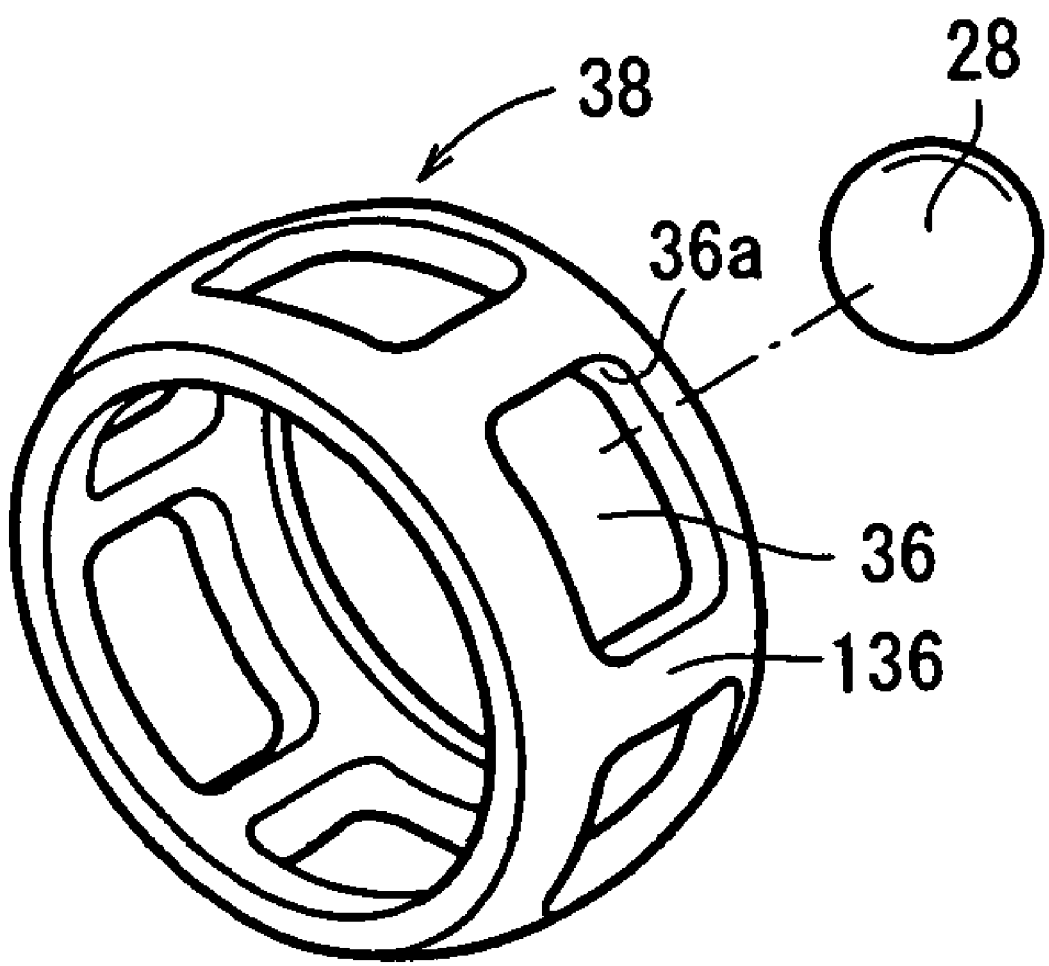
FIG. 21 is an exploded perspective view of a retainer and a ball of the constant-velocity joint shown in FIG. 20.
Figure 22:
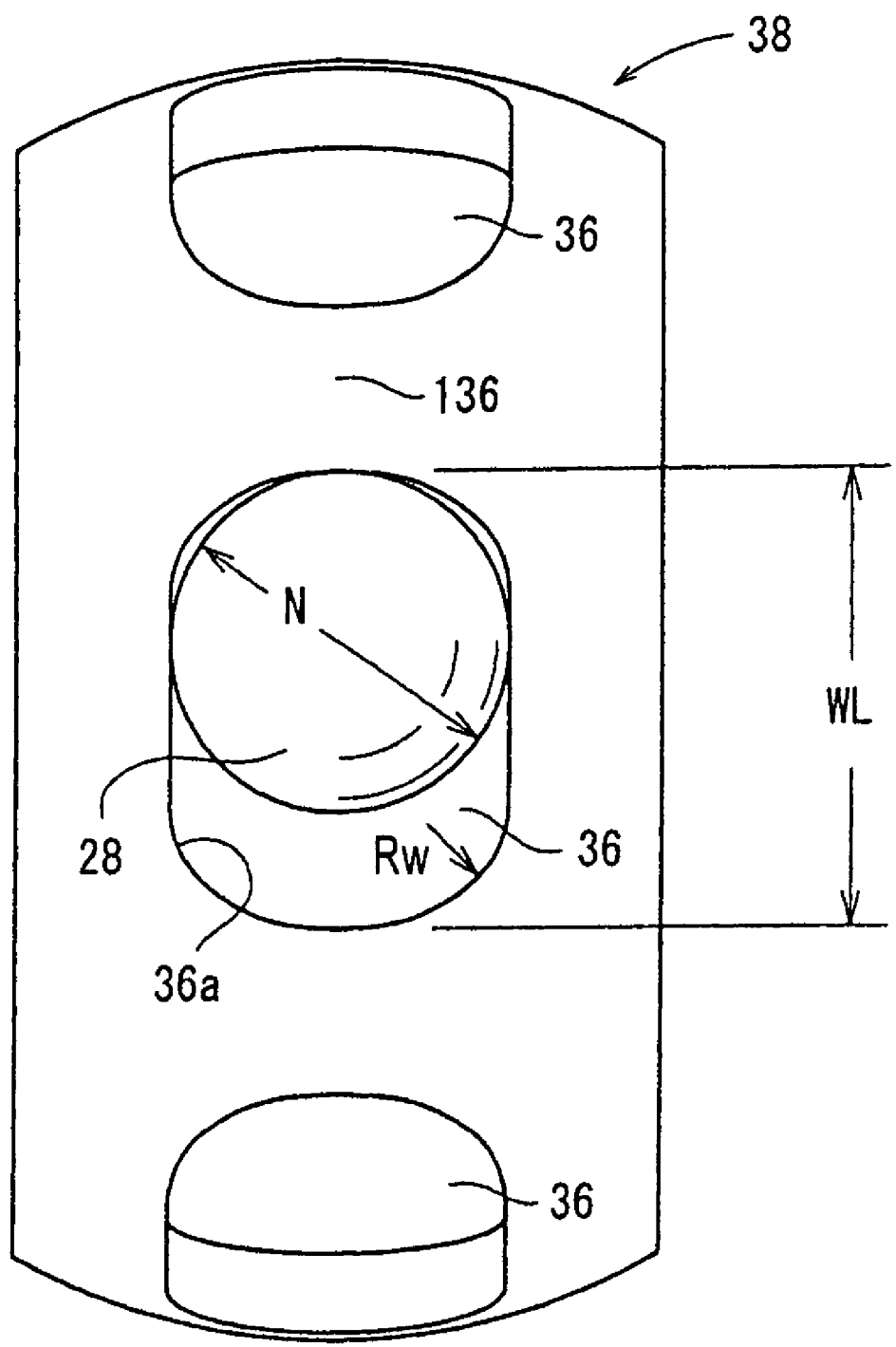
FIG. 22 is a circumferential side elevational view showing various dimensions of the retainer and the ball shown in FIG. 21.

As shown in FIGS. 21 and 22, the retainer 38 is substantially ring-shaped and has six retaining windows 36 for retaining the respective balls 28 therein. The retaining windows 36 are angularly spaced at equal angular intervals in the circumferential direction.

As shown in FIG. 22, each of the retaining windows 36 has an opening length (WL) in the circumferential direction of the retainer 38. The ratio (WL/N) of the opening length (WL) to the diameter (N) of the balls 28 is set to a value in the range of $1.30 \leq WL/N \leq 1.42$. Each of the retaining windows 36 has corners 36a each having a radius Rw of curvature. The ratio (R/N) of the radius Rw of curvature to the diameter (N) of the balls 28 is set to a value in the range of $0.23 \leq R/N \leq 0.45$.

With respect to each of the retaining windows 36, as shown in FIG. 22, the ratio (WL/N) of the opening length (WL) to the diameter (N) of the balls 28 is set to a value in the range of $WL/N \leq 1.42$. Therefore, the retainer 38 can effectively maintain the circumferential length of columns 136 between the retaining windows 36. There is no need to increase the wall thickness of the retainer 38, and the cross-sectional area of the columns 136 can be increased.

Thus, the mechanical strength of the retainer 38 is increased without the need for reducing the diameter of the spherical inside-diameter surface thereof, increasing the diameter of the spherical outside-diameter surface thereof, and increasing the width thereof in the axial direction.

With the constant-velocity joint 10, the ratio (WL/N) of the opening length (WL) of each of the retaining windows 36 to the diameter (N) of the balls 28 is set to a value in the range of $1.30 \leq WL/N$. Therefore, the opening area of the retaining windows 36 can be increased, allowing the balls 28 to be assembled with ease and also allowing the inner ring 34 to be assembled with ease. Consequently, the constant-velocity joint 10 is of a simple construction and can be assembled easily.

The ratio (R/N) of the radius R of curvature of the corners 36a of each of the retaining windows 36 to the diameter (N) of the balls 28 is set to a value in the range of $0.23 \leq R/N$. This ratio setting is effective to reduce a maximum major stress load on the columns 136 between the retaining windows 36, for increasing the mechanical strength of the retainer 38.

The ratio (R/N) is also set to a value in the range of $R/N \leq 0.45$ to prevent the balls 28 and the inner ring 34 from failing to be assembled due to an excessively large radius of curvature of the corners 36a of the retaining windows 36.

Each of the first guide grooves 26a through 26f has a straight region S1 extending in the longitudinal direction thereof, and each of the second guide grooves 32a through 32f has a straight region S2 extending in the longitudinal direction thereof. Such straight regions S1, S2 make it possible for the constant-velocity joint 10 to have a larger maximum joint angle.

Figure 23:
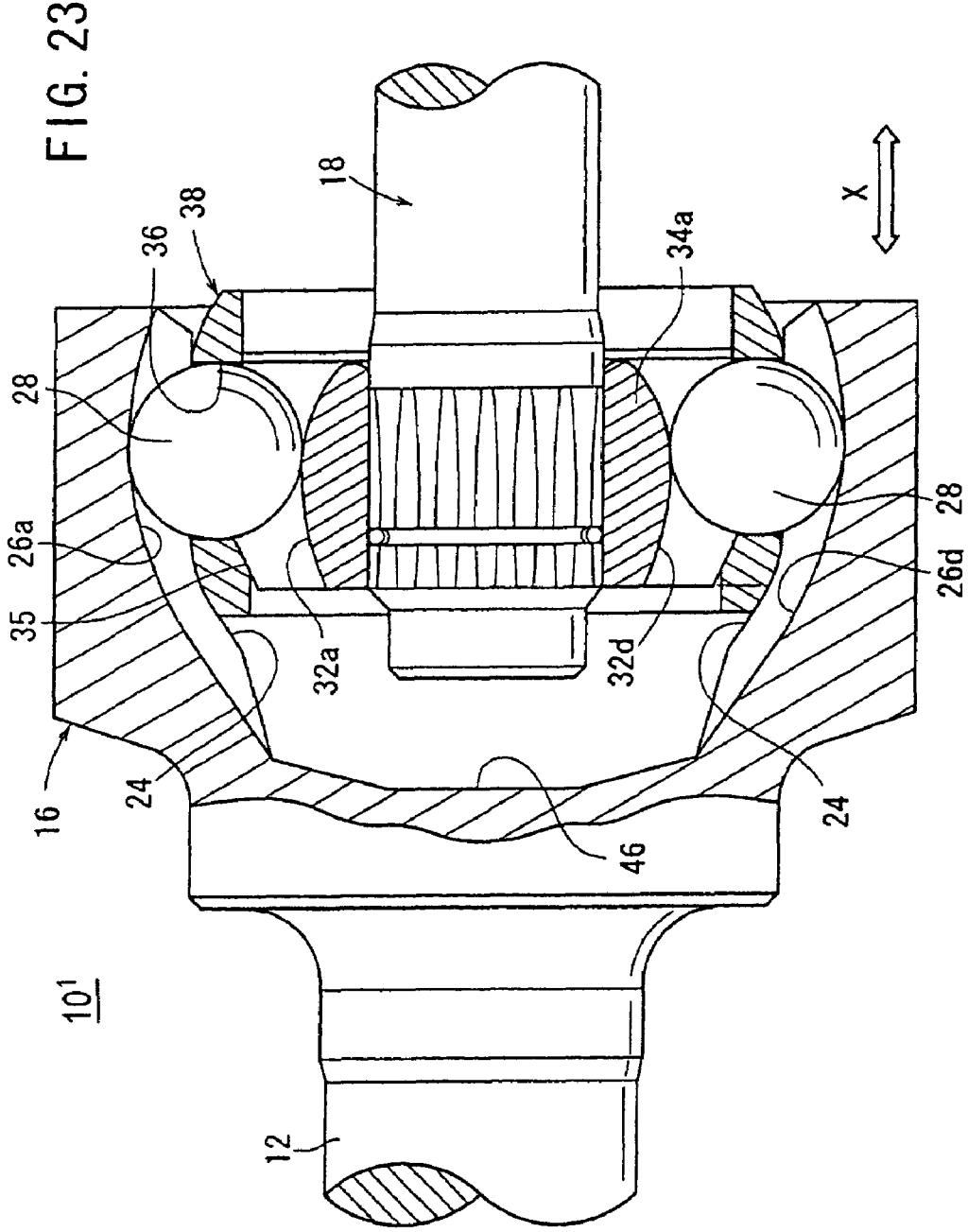
FIG. 23 is a longitudinal cross-sectional view, taken along an axial direction, of a constant-velocity joint in illustration of the first guide grooves and the second guide grooves has only a curved region extending in a longitudinal direction thereof.
Figure 24:
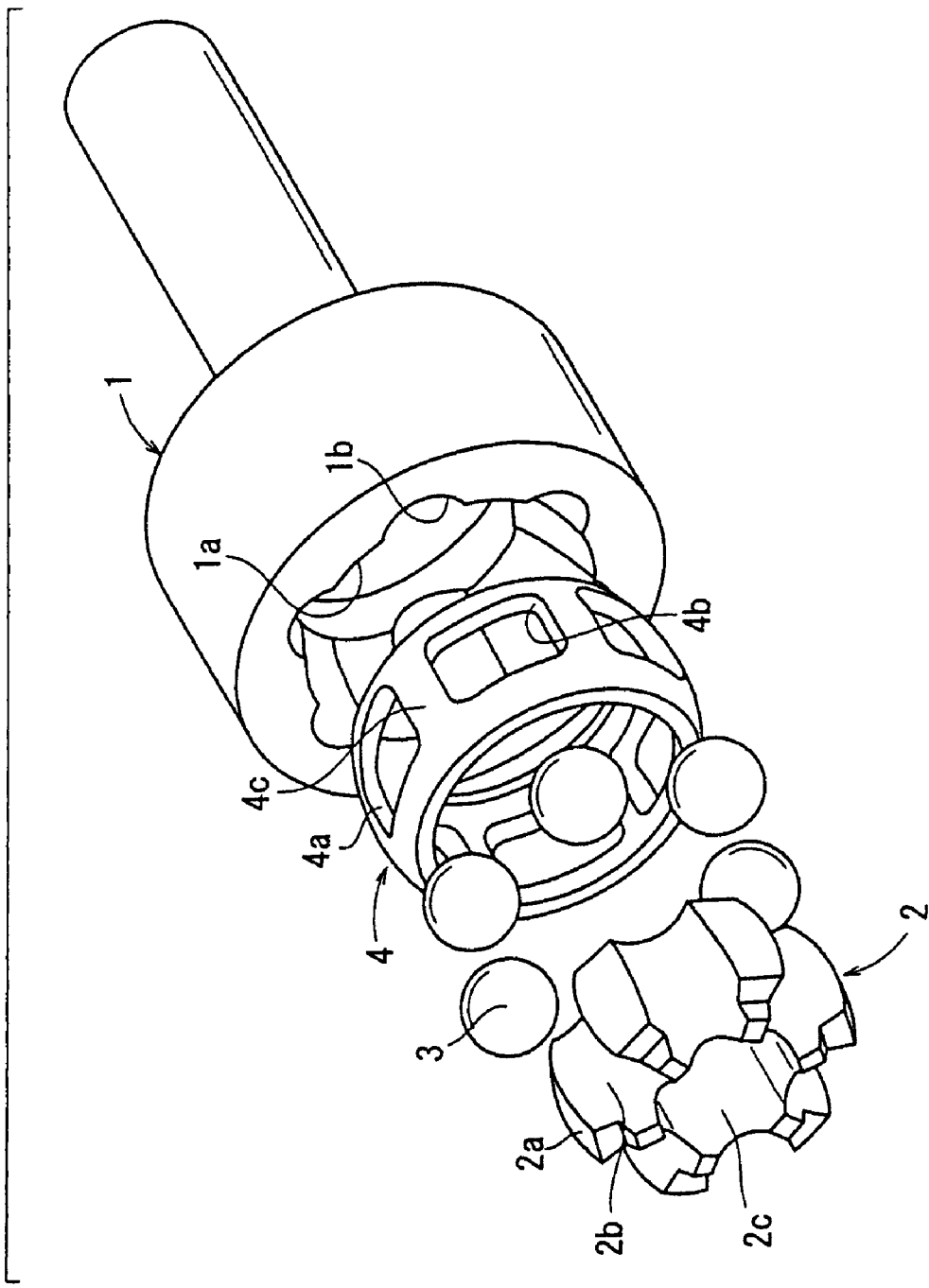
FIG. 24 is an exploded perspective view of a conventional constant-velocity joint.

FIG. 23 illustrate an alternative embodiment of a constant velocity joint 10' with similar features as those illustrated in FIG. 1-22, except for each of the first guide grooves 26a through 26f and the second guide grooves 32a through 32f has only a curved region extending in the longitudinal direction thereof.

The invention claimed is:

1. A constant-velocity joint comprising:
   an outer member connected to one of two shafts which are angularly movable relative to each other and having an inner circumferential surface having a plurality of first guide grooves extending in an axial direction thereof, said outer member having an open end;
   an inner ring connected to the other of said two shafts and having as many second guide grooves as the number of said first guide grooves, said second guide grooves extending in an axial direction thereof;
   a plurality of balls rollingly disposed between said first guide grooves and said second guide grooves, for transmitting a torque between said outer member and said inner ring; and
   a retainer having retaining windows retaining said balls, respectively, therein,
   wherein each of said first guide grooves has a transverse cross section extending perpendicularly to said axial direction and having a single arcuate shape, each of said first guide grooves being held in contact with a corresponding one of the balls at a single point, and wherein each of said second guide grooves has a transverse cross section extending perpendicularly to said axial direction and having elliptically arcuate shape, each of said second guide grooves being held in contact with a corresponding one of the balls at two points.

2. A constant-velocity joint according to claim 1, wherein ratios of a radius of each of said first guide grooves in a transverse cross section thereof and radiuses of each of said second guide grooves in a transverse cross section thereof to a diameter of said balls are set in a range from 0.51 to 0.55, a contact angle of each of the balls with respect to one of said first guide grooves is set to zero on a vertical line extending across the ball, and a contact angle ($\alpha$) of each of the balls with respect to one of said second guide grooves is set in a range from 13 degrees to 22 degrees from the vertical line.

3. A constant-velocity joint according to claim 2, wherein the contact angle ($\alpha$) of each of the balls with respect to one of said second guide grooves is set in a range from 15 degrees to 20 degrees from the vertical line.

4. A constant-velocity joint comprising:

an outer member connected to one of two shafts which are angularly movable relative to each other and having a spherical inside-diameter surface having a plurality of first guide grooves extending in an axial direction thereof, said outer member having an open end;

an inner ring connected to the other of said two shafts and having as many second guide grooves as the number of said first guide grooves, said second guide grooves extending in an axial direction thereof;

a plurality of balls rollingly disposed between said first guide grooves and said second guide grooves, for transmitting a torque between said outer member and said inner ring; and a retainer having retaining windows retaining said balls, respectively, therein, wherein each of said first guide grooves has a curved longitudinal cross section extending in the axial direction and having a center of curvature, each of said second guide grooves has a curved longitudinal cross section extending in the axial direction and having a center of curvature, and said centers of curvature are offset oppositely in the axial direction by equal distances from a center of said spherical inside-diameter surface, and wherein the ratio V of each of the distances by which said centers of curvature are offset from said center of said spherical inside-diameter surface to the diameter of said balls is set to satisfy the expression $0.12 \leq V \leq 0.14$.

5. A constant-velocity joint according to claim 4, wherein each of said first guide grooves has a transverse cross section extending perpendicularly to said axial direction and having a single arcuate shape, each of said first guide grooves being held in contact with a corresponding one of the balls at a single point, and wherein each of said second guide grooves has a transverse cross section extending perpendicularly to said axial direction and having elliptically arcuate shape, each of said second guide grooves being held in contact with a corresponding one of the balls at two points.

6. A constant-velocity joint according to claim 5, wherein ratios of a radius of each of said first guide grooves in a transverse cross section thereof and radiuses of each of said second guide grooves in a transverse cross section thereof to a diameter of said balls are set in a range from 0.51 to 0.55, a contact angle of each of the balls with respect to one of said first guide grooves is set to zero on a vertical line extending across the ball, and a contact angle ($\alpha$) of each of the balls with respect to one of said second guide grooves is set in a range from 13 degrees to 22 degrees from the vertical line.

7. A constant-velocity joint according to claim 6, wherein the contact angle ($\alpha$) of each of the balls with respect to one of said second guide grooves is set in a range from 15 degrees to 20 degrees from the vertical line.

8. A constant-velocity joint comprising:

an outer member connected to one of two shafts which are angularly movable relative to each other and having an inner circumferential surface having a plurality of first guide grooves extending in an axial direction thereof, said outer member having an open end;

an inner ring connected to the other of said two shafts and having as many second guide grooves as the number of said first guide grooves, said second guide grooves extending in an axial direction thereof;

six balls rollingly disposed between said first guide grooves and said second guide grooves, for transmitting a torque between said outer member and said inner ring; and a retainer having retaining windows retaining said balls, respectively, therein, wherein said first guide grooves have a pitch circle diameter represented as an outer PCD, said second guide grooves have a pitch circle diameter represented as an inner PCD, and a PCD clearance represented by a difference between said outer PCD and said inner PCD (the outer PCD-the inner PCD) is set in a range from 0 to 100 µm, wherein a spherical clearance established as a sum of a difference between an outer member inner-spherical-surface diameter which is a diameter of an inside-diameter surface of said outer member and a retainer outer-spherical-surface diameter which is a diameter of an outer surface of said retainer, and a difference between a retainer inner-spherical-surface diameter which is a diameter of an inner surface of said retainer and an inner ring outer-spherical-surface diameter which is a diameter of an outer surface of said inner ring is set in a range from 50 to 200 µm in accordance with the following expression:

50 µm $\leq$ {(outer member inner-spherical-surface diameter)−(retainer outer-spherical-surface diameter)}+{(retainer inner-spherical-surface diameter)−(inner ring outer-spherical-surface diameter)} $\leq$ 200 µm.

9. A constant-velocity joint comprising:

an outer member connected to one of two shafts which are angularly movable relative to each other and having an inside-diameter surface having a plurality of first guide grooves extending in an axial direction thereof, said outer member having an open end;

an inner ring connected to the other of said two shafts and having as many second guide grooves as the number of said first guide grooves, said second guide grooves extending in an axial direction thereof;

six balls rollingly disposed between said first guide grooves and said second guide grooves, for transmitting a torque between said outer member and said inner ring; and a retainer having retaining windows retaining said balls, respectively, therein, wherein said first guide grooves have a pitch circle diameter represented as an outer PCD, said second guide grooves have a pitch circle diameter represented as an inner PCD, and a ratio (Dp/D) of a dimension (Dp) of an outer/inner PCD, which represents the outer PCD and the inner PCD that are equal to each other, to a diameter (D) of an inner-ring serrated-region inside-diameter surface on an inner wall of said inner ring is set in a range of $1.9 \leq (Dp/D) \leq 2.2$.

10. A constant-velocity joint comprising:

an outer member connected to one of two shafts which are angularly movable relative to each other and having an inside-diameter surface having a plurality of first guide grooves extending in an axial direction thereof, said outer member having an open end;

an inner ring connected to the other of said two shafts and having as many second guide grooves as the number of said first guide grooves, said second guide grooves extending in an axial direction thereof;

six balls rollingly disposed between said first guide grooves and said second guide grooves, for transmitting a torque between said outer member and said inner ring; and a retainer having retaining windows retaining said balls, respectively, therein, wherein said first guide grooves have a pitch circle diameter represented as an outer PCD, said second guide grooves have a pitch circle diameter represented as an inner PCD, and a ratio (Do/Dp) of an outside diameter (Do) of said outer member to a dimension (Dp) of an outer/inner PCD, which represents the outer PCD and the inner PCD that are equal to each other, is set in a range of $1.4 \leq (Do/Dp) \leq 1.8$.

11. A constant-velocity joint comprising:

an outer member connected to one of two shafts which are angularly movable relative to each other and having an inside-diameter surface having a plurality of first guide grooves extending in an axial direction thereof, said outer member having an open end;

an inner ring connected to the other of said two shafts and having as many second guide grooves as the number of said first guide grooves, said second guide grooves extending in an axial direction thereof;

six balls rollingly disposed between said first guide grooves and said second guide grooves, for transmitting a torque between said outer member and said inner ring; and a retainer having retaining windows retaining said balls, respectively, therein, wherein said first guide grooves have a pitch circle diameter represented as an outer PCD, said second guide grooves have a pitch circle diameter represented as an inner PCD, and a ratio (Dp/D) of a dimension (Dp) of an outer/inner PCD, which represents the outer PCD and the inner PCD that are equal to each other, to a diameter (D) of an inner-ring serrated-region inside-diameter surface on an inner wall of said inner ring is set in a range of $1.9 \leq (Dp/D) \leq 2.2$, wherein a ratio (N/Dp) of a diameter (N) of said balls to the dimension (Dp) of the outer/inner PCD, which represents the outer PCD and the inner PCD that are equal to each other, is set in a range of $0.2 \leq (N/Dp) \leq 0.5$, and wherein a ratio (Do/Dp) of an outside diameter (Do) of said outer member to the dimension (Dp) of the outer/inner PCD, which represents the outer PCD and the inner PCD that are equal to each other, is set in a range of $1.4 \leq (Do/Dp) \leq 1.8$.

12. A constant-velocity joint comprising:

an outer member connected to one of two shafts which are angularly movable relative to each other and having an inner circumferential surface having a plurality of first guide grooves extending in an axial direction thereof, said outer member having an open end;

an inner ring connected to the other of said two shafts and having an outer circumferential surface having as many second guide grooves as the number of said first guide grooves, said second guide grooves extending in an axial direction thereof;

a plurality of balls rollingly disposed between said first guide grooves and said second guide grooves, for transmitting a torque between said outer member and said inner ring; and a retainer having retaining windows retaining said balls, respectively, therein, wherein each of said retaining windows has an opening length (WL) extending in a circumferential direction of said retainer, and a ratio (WL/N) of said opening length (WL) to a diameter (N) of said balls is set in a range of $1.30 \leq (WL/N) \leq 1.42$.

13. A constant-velocity joint according to claim 12, wherein each of said retaining windows has corners each having a radius (R) of curvature, and a ratio (R/N) of said radius (R) of curvature to the diameter (N) of said balls is set in a range of $0.23 \leq (R/N) \leq 0.45$.

14. A constant-velocity joint according to claim 12, wherein each of said first guide grooves and said second guide grooves has a curved region and a straight region extending in a longitudinal direction thereof.

15. A constant-velocity joint according to claim 12, wherein each of said first guide grooves and said second guide grooves has only a curved region extending in a longitudinal direction thereof.

16. A constant-velocity joint comprising:

an outer member connected to one of two shafts which are angularly movable relative to each other and having an inner circumferential surface having a plurality of first guide grooves extending in an axial direction thereof, said outer member having an open end;

an inner ring connected to the other of said two shafts and having as many second guide grooves as the number of said first guide grooves, said second guide grooves extending in an axial direction thereof;

six balls rollingly disposed between said first guide grooves and said second guide grooves, for transmitting a torque between said outer member and said inner ring; and a retainer having retaining windows retaining said balls, respectively, therein, wherein each of said first guide grooves has a transverse cross section extending perpendicularly to said axial direction and having a single arcuate shape, each of said first guide grooves being held in contact with a corresponding one of the balls at a single point, wherein each of said second guide grooves has a transverse cross section extending perpendicularly to said axial direction and having elliptically arcuate shape, each of said second guide grooves being held in contact with a corresponding one of the balls at two points, and wherein said first guide grooves have a pitch circle diameter represented as an outer PCD, said second guide grooves have a pitch circle diameter represented as an inner PCD, and a PCD clearance represented by a difference between said outer PCD and said inner PCD (the outer PCD-the inner PCD) is set in a range from 0 to 100 μm.

17. A constant-velocity joint according to claim 16, wherein ratios of a radius of each of said first guide grooves in a transverse cross section thereof and radiuses of each of said second guide grooves in a transverse cross section thereof to a diameter of said balls are set in a range from 0.51 to 0.55, a contact angle of each of the balls with respect to one of said first guide grooves is set to zero on a vertical line extending across the ball, and a contact angle (α) of each of the balls with respect to one of said second guide grooves is set in a range from 13 degrees to 22 degrees from the vertical line.

18. A constant-velocity joint according to claim 16, wherein the contact angle (α) of each of the balls with respect to one of said second guide grooves is set in a range from 15 degrees to 20 degrees from the vertical line.

19. A constant-velocity joint according to claim 16, wherein a spherical clearance established as a sum of a difference between an outer member inner-spherical-surface diameter which is a diameter of an inside-diameter surface of said outer member and a retainer outer-spherical-surface diameter which is a diameter of an outer surface of said retainer, and a difference between a retainer inner-spherical-surface diameter which is a diameter of an inner surface of said retainer and an inner ring outer-spherical-surface diameter which is a diameter of an outer surface of said inner ring is set in a range from 50 to 200 μm in accordance with the following expression:

50 μm≦{(outer member inner-spherical-surface diameter)−(retainer outer-spherical-surface diameter)}+{(retainer inner-spherical-surface diameter)−(inner ring outer-spherical-surface diameter)}≦200 μm.

20. A constant-velocity joint according to claim 16, wherein each of said retaining windows of the retainer has a transverse center which is offset from a center of spherical outer and inner surfaces of said retainer in an axial direction of the retainer by a distance ranging from 20 to 100 μm.

21. A constant-velocity joint according to claim 16, wherein a ratio (Dp/D) of a dimension (Dp) of an outer/inner PCD, which represents the outer PCD and the inner PCD that are equal to each other, to a diameter (D) of an inner-ring serrated-region inside-diameter surface on an inner wall of said inner ring is set in a range of 1.9≦(Dp/D)≦2.2.

22. A constant-velocity joint according to claim 16, wherein a ratio (N/Dp) of a diameter (N) of said balls to a dimension (Dp) of an outer/inner PCD, which represents the outer PCD and the inner PCD that are equal to each other, is set in a range of 0.2≦(N/Dp)≦0.5.

23. A constant-velocity joint according to claim 16, wherein a ratio (Do/Dp) of an outside diameter (Do) of said outer member to a dimension (Dp) of an outer/inner PCD, which represents the outer PCD and the inner PCD that are equal to each other, is set in a range of 1.4≦(Do/Dp)≦1.8.

24. A constant-velocity joint according to claim 16, wherein a ratio (Dp/D) of a dimension (Dp) of an outer/inner PCD, which represents the outer PCD and the inner PCD that are equal to each other, to a diameter (D) of an inner-ring serrated-region inside-diameter surface on an inner wall of said inner ring is set in a range of 1.9≦(Dp/D)≦2.2,
wherein a ratio (N/Dp) of a diameter (N) of said balls to the dimension (Dp) of the outer/inner PCD, which represents the outer PCD and the inner PCD that are equal to each other, is set in a range of 0.2≦(N/Dp)≦0.5, and
wherein a ratio (Do/Dp) of an outside diameter (Do) of said outer member to the dimension (Dp) of the outer/inner PCD is set in a range of 1.4≦(Do/Dp)≦1.8.

25. A constant-velocity joint according to claim 16, wherein each of said retaining windows has an opening length (WL) extending in a circumferential direction of said retainer, and a ratio (WL/D) of said opening length (WL) to a diameter (D) of said balls is set in a range of 1.30≦(WL/D)≦1.42.

26. A constant-velocity joint according to claim 25, wherein each of said retaining windows has corners each having a radius (R) of curvature, and a ratio (R/N) of said radius (R) of curvature to the diameter (N) of said balls is set in a range of 0.23≦(R/N)≦0.45.

27. A constant-velocity joint according to claim 25, wherein each of said first guide grooves and said second guide grooves has a curved region and a straight region extending in a longitudinal direction thereof.

28. A constant-velocity joint according to claim 25, wherein each of said first guide grooves and said second guide grooves has only a curved region extending in a longitudinal direction thereof.

29. A constant-velocity joint comprising:
an outer member connected to one of two shafts which are angularly movable relative to each other and having a spherical inside-diameter surface having a plurality of first guide grooves extending in an axial direction thereof, said outer member having an open end;
an inner ring connected to the other of said two shafts and having as many second guide grooves as the number of said first guide grooves, said second guide grooves extending in an axial direction thereof;
six balls rollingly disposed between said first guide grooves and said second guide grooves, for transmitting a torque between said outer member and said inner ring; and
a retainer having retaining windows retaining said balls, respectively, therein,
wherein each of said first guide grooves has a transverse cross section extending perpendicularly to said axial direction and having a single arcuate shape, each of said first guide grooves being held in contact with a corresponding one of the balls at a single point,
wherein each of said second guide grooves has a transverse cross section extending perpendicularly to said axial direction and having elliptically arcuate shape, each of said second guide grooves being held in contact with a corresponding one of the balls at two points,
wherein said first guide grooves have a pitch circle diameter represented as an outer PCD, said second guide grooves have a pitch circle diameter represented as an inner PCD, and a PCD clearance represented by a difference between said outer PCD and said inner PCD (the outer PCD−the inner PCD) is set in a range from 0 to 100 μm,
wherein each of said first guide grooves has a curved longitudinal cross section extending in the axial direction and having a center of curvature, each of said second guide grooves has a curved longitudinal cross section extending in the axial direction and having a center of curvature, and said centers of curvature are offset oppositely in the axial direction by equal distances from a center of said spherical inside-diameter surface, and
wherein the ratio V of each of the distances by which said centers of curvature are offset from said center of said spherical inside-diameter surface to the diameter of said balls is set to satisfy the expression 0.12≦V≦0.14.

30. A constant-velocity joint according to claim 29, wherein ratios of a radius of each of said first guide grooves in a transverse cross section thereof and radiuses of each of said second guide grooves in a transverse cross section thereof to a diameter of said balls are set in a range from 0.51 to 0.55, a contact angle of each of the balls with respect to one of said first guide grooves is set to zero on a vertical line extending across the ball, and a contact angle (α) of each of the balls with respect to one of said second guide grooves is set in a range from 13 degrees to 22 degrees from the vertical line.

31. A constant-velocity joint according to claim 29, wherein the contact angle ($\alpha$) of each of the balls with respect to one of said second guide grooves is set in a range from 15 degrees to 20 degrees from the vertical line.

32. A constant-velocity joint according to claim 29, wherein a spherical clearance established as a sum of a difference between an outer member inner-spherical-surface diameter which is a diameter of an inside-diameter surface of said outer member and a retainer outer-spherical-surface diameter which is a diameter of an outer surface of said retainer, and a difference between a retainer inner-spherical-surface diameter which is a diameter of an inner surface of said retainer and an inner ring outer-spherical-surface diameter which is a diameter of an outer surface of said inner ring is set in a range from 50 to 200 μm in accordance with the following expression:

50 μm≦{(outer member inner-spherical-surface diameter)−(retainer outer-spherical-surface diameter)}+{(retainer inner-spherical-surface diameter)−(inner ring outer-spherical-surface diameter)}≦200 μm.

33. A constant-velocity joint according to claim 29, wherein each of said retaining windows of the retainer has a transverse center which is offset from a center of spherical outer and inner surfaces of said retainer in an axial direction of the retainer by a distance ranging from 20 to 100 μm.

34. A constant-velocity joint according to claim 29, wherein a ratio (Dp/D) of a dimension (Dp) of an outer/inner PCD, which represents the outer PCD and the inner PCD that are equal to each other, to a diameter (D) of an inner-ring serrated-region inside-diameter surface on an inner wall of said inner ring is set in a range of 1.9≦(Dp/D)≦2.2.

35. A constant-velocity joint according to claim 29, wherein a ratio (N/Dp) of a diameter (N) of said balls to a dimension (Dp) of an outer/inner PCD, which represents the outer PCD and the inner PCD that are equal to each other, is set in a range of 0.2≦(N/Dp)≦0.5.

36. A constant-velocity joint according to claim 29, wherein a ratio (Do/Dp) of an outside diameter (Do) of said outer member to a dimension (Dp) of an outer/inner PCD, which represents the outer PCD and the inner PCD that are equal to each other, is set in a range of 1.4≦(Do/Dp)≦1.8.

37. A constant-velocity joint according to claim 29, wherein a ratio (Dp/D) of a dimension (Dp) of an outer/inner PCD, which represents the outer PCD and the inner PCD that are equal to each other, to a diameter (D) of an inner-ring serrated-region inside-diameter surface on an inner wall of said inner ring is set in a range of 1.9≦(Dp/D)≦2.2,
wherein a ratio (N/Dp) of a diameter (N) of said balls to the dimension (Dp) of the outer/inner PCD, which represents the outer PCD and the inner PCD that are equal to each other, is set in a range of 0.2≦(N/Dp)≦0.5, and wherein a ratio (Do/Dp) of an outside diameter (Do) of said outer member to the dimension (Dp) of the outer/inner PCD, which represents the outer PCD and the inner PCD that are equal to each other, is set in a range of 1.4≦(Do/Dp)≦1.8.

38. A constant-velocity joint according to claim 29, wherein each of said retaining windows has an opening length (WL) extending in a circumferential direction of said retainer, and a ratio (WL/N) of said opening length (WL) to a diameter (N) of said balls is set in a range of 1.30≦(WL/N)≦1.42.

39. A constant-velocity joint according to claim 38, wherein each of said retaining windows has corners each having a radius (R) of curvature, and a ratio (R/N) of said radius (R) of curvature to the diameter (N) of said balls is set in a range of 0.23≦(R/N)≦0.45.

40. A constant-velocity joint according to claim 38, wherein each of said first guide grooves and said second guide grooves has a curved region and a straight region extending in a longitudinal direction thereof.

41. A constant-velocity joint according to claim 38, wherein each of said first guide grooves and said second guide grooves has only a curved region extending in a longitudinal direction thereof.

42. A constant-velocity joint, comprising:
an outer member connected to one of two shafts which are angularly movable relative to each other and having an inner circumferential surface having a plurality of first guide grooves extending in an axial direction thereof, said outer member having an open end;
an inner ring connected to the other of said two shafts and having as many second guide grooves as the number of said first guide grooves, said second guide grooves extending in an axial direction thereof;
six balls rollingly disposed between said first guide grooves and said second guide grooves, for transmitting a torque between said outer member and said inner ring; and
a retainer having retaining windows retaining said balls, respectively, therein,
wherein said first guide grooves have a pitch circle diameter represented as an outer PCD, said second guide grooves have a pitch circle diameter represented as an inner PCD, and a PCD clearance represented by a difference between said outer PCD and said inner PCD (the outer PCD-the inner PCD) is set in a range from 0 to 100 μm,
wherein each of said retaining windows of the retainer has a transverse center which is offset from a center of spherical outer and inner surfaces of said retainer in an axial direction of the retainer by a distance ranging from 20 to 100 μm.

* * * * *